United States Patent
Sakaue et al.

(10) Patent No.: US 8,384,964 B2
(45) Date of Patent: Feb. 26, 2013

(54) IMAGE PROCESSING APPARATUS AND IMAGE PROCESSING METHOD

(75) Inventors: Tsutomu Sakaue, Yokohama (JP); Takeshi Namikata, Yokohama (JP); Shinji Sano, Kawasaki (JP); Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 12/431,325

(22) Filed: Apr. 28, 2009

(65) Prior Publication Data

US 2009/0284801 A1 Nov. 19, 2009

(30) Foreign Application Priority Data

May 14, 2008 (JP) ................................. 2008-127380

(51) Int. Cl.
*H04N 1/409* (2006.01)
*G06K 15/00* (2006.01)
*G06K 9/18* (2006.01)
*G06K 9/46* (2006.01)

(52) U.S. Cl. ........ 358/3.27; 358/2.1; 382/181; 382/182; 382/195

(58) Field of Classification Search ................. 358/3.27, 358/474, 1.9, 403, 1.15, 3.28, 2.1; 382/182, 382/181, 195; 345/173, 649
See application file for complete search history.

(56) References Cited

U.S. PATENT DOCUMENTS

| | | | |
|---|---|---|---|
| 5,960,121 A | 9/1999 | Takahashi | |
| 7,298,896 B2 | 11/2007 | Yamaguchi et al. | |
| 7,948,664 B2 * | 5/2011 | Morimoto et al. | ............ 358/474 |
| 2007/0262992 A1 | 11/2007 | Ito | |
| 2008/0002230 A1 | 1/2008 | Sakaue | |

FOREIGN PATENT DOCUMENTS

| | | |
|---|---|---|
| JP | 8272952 A | 10/1996 |
| JP | 2001-251507 A | 9/2001 |
| JP | 2003-163810 A | 6/2003 |
| JP | 2006-155572 A | 6/2006 |
| JP | 2006-345314 A | 12/2006 |
| JP | 2007-060262 A | 3/2007 |
| JP | 2007-305034 A | 11/2007 |
| JP | 2008-103917 A | 5/2008 |

OTHER PUBLICATIONS

Japanese Office Action issued on Apr. 23, 2012, in counterpart JP application No. 2008-127380.
Japanese Office Action issued Oct. 26, 2012, in counterpart Japanese Patent Application No. 2008-127380.

* cited by examiner

*Primary Examiner* — Charlotte M Baker

(74) *Attorney, Agent, or Firm* — Fitzpatrick, Cella, Harper & Scinto

(57) ABSTRACT

Each object in input image data is separated into an area by an image area separation unit. An area determined to be a character area based on the image area separation processing is smoothened by an MTF correction unit. The resulting data is then binarized by a binarizing unit. The binarized data is split according to types of objects, and characters and line drawings are vectorized and stored in a storage unit. Alternatively, the characters and line drawings are printed out.

13 Claims, 24 Drawing Sheets

| INNER EDGE DETERMINATION | 0 | 0 | 0 | 0 | 1 | 1 | 1 | 1 |
|---|---|---|---|---|---|---|---|---|
| AREA ACCUMULATION DETERMINATION FOR INNER EDGE DETERMINATION | 0 | 0 | 1 | 1 | 0 | 0 | 1 | 1 |
| AREA ACCUMULATION DETERMINATION FOR OUTER EDGE DETERMINATION | 0 | 1 | 0 | 1 | 0 | 1 | 0 | 1 |
| CHARACTER EDGE DETERMINATION | 0 | 0 | 1 | 0 | 1 | 1 | 1 | 1 |

BLOCK INFORMATION

| | ATTRIBUTE | COORDINATE X | COORDINATE Y | WIDTH W | HEIGHT H | VECTOR INFORMATION |
|---|---|---|---|---|---|---|
| BLOCK 1 | 1 | X1 | Y1 | W1 | H1 | YES |
| BLOCK 2 | 3 | X2 | Y2 | W2 | H2 | YES |
| BLOCK 3 | 2 | X3 | Y3 | W3 | H3 | NO |
| BLOCK 4 | 1 | X4 | Y4 | W4 | H4 | YES |
| BLOCK 5 | 3 | X5 | Y5 | W5 | H5 | YES |
| BLOCK 6 | 2 | X6 | Y6 | W6 | H6 | NO |

ATTRIBUTE 1: CHARACTER, 2: PHOTOGRAPH, 3: GRAPHIC

INPUT FILE INFORMATION

| TOTAL NUMBER OF BLOCKS | N (=6) |
|---|---|

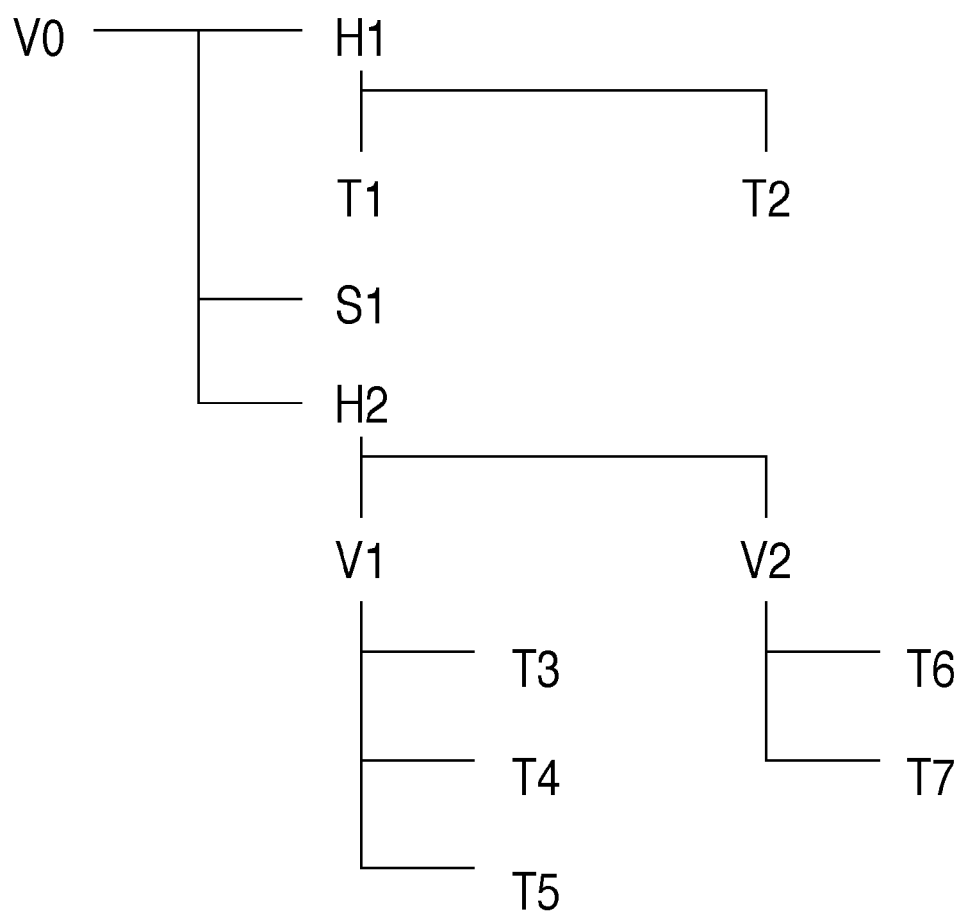
F I G. 25

IMAGE PROCESSING APPARATUS AND IMAGE PROCESSING METHOD

BACKGROUND OF THE INVENTION

1. Field of the Invention

The present invention relates to an image processing apparatus and an image processing method, and in particular to an image processing apparatus and image processing method that can restore image data that is more faithful to an original image, from image data on which another image processing apparatus has performed image processing.

2. Description of the Related Art

Digital multifunction peripherals (MFP) have conventionally been used in a standalone situation for copying use, but in recent years, as intranets and the Internet have become widely used, it has become possible to use MFPs via a network. An MFP connected to a network can, for example, receive image data that has been digitized by another MFP via the network, and print and file the received image data.

There are cases in which various types of image processing are performed in MFPs in order to improve the quality of image data obtained by reading a document with use of a scanner. For example, in order to improve the reproducibility of characters in a document, a method has been proposed in which a document is divided into character areas and photograph areas, and the character areas are edge-emphasized (e.g., see Japanese Patent Laid-Open No. H8-272952).

However, there are cases in which image processing differs depending on the type of MFP, and therefore if a MFP prints or files image data that has been digitized by a different type of MFP, it is possible for image degradation to occur. For example, in the image processing apparatus disclosed in Japanese Patent Laid-Open No. H8-272952, even in the case of a document image that has a low density and is low contrast (i.e., an image having a large amount of noise), characters on the background pattern can be reproduced favorably, and isolated points that appear in the character areas due to noise can be reduced. When the above apparatus outputs an image in a standalone situation, the use of such a function will improve the quality of the output image. However, when an output character image from an apparatus having such a function is compared to an output character image from an apparatus that does not have such a function, there are cases in which there are differences in portions other than the improved portion as well. For example, the lines in a binarized character image have been thinned down due to an edge-emphasizing process. This means that if these two types of MFPs input the same document by scanning, different images are output. This is not particularly a problem when MFPs are used in a standalone situation, such as copying.

However, when reading a document with an MFP, filing the read document as image data, and reusing the image data is taken into consideration, an image (particularly a character image) that has been read by different MFPs and should originally be the same will be output at different qualities. This leads to differences in the reproducibility and readability of characters in the filed image data, and can reduce the value of the filed document.

SUMMARY OF THE INVENTION

The present invention has been achieved in light of the above conventional example, and therefore provides an image processing apparatus and an image processing method that address the above-described problems.

More specifically, in the present invention, an area whose object type is a character or a line drawing is specified in image data, a spatial frequency characteristic of image data in the area is converted, and the image data is smoothened. Doing this enables providing an image processing apparatus and an image processing method that can output line drawings or characters that have been edge-emphasized, without the characters or line drawings being thinned down in comparison to line drawings or characters that have not been edge-emphasized.

The present invention has the following structure.

An image processing apparatus includes: an image area separator that specifies an area for each object type in image data; a converter that converts a spatial frequency characteristic of the image data; and a binarizer that binarizes the image data whose spatial frequency characteristic has been converted by the converter, wherein the converter smoothens image data in an area that has been specified by the image area separator and whose object type is a character or a line drawing, by converting a spatial frequency characteristic of the image data in the area.

The above aspect of the present invention enables outputting a line drawing or character that has been edge-emphasized, without the character or line drawing being thinned down in comparison to a line drawing or character that has not been edge-emphasized, thereby preventing degradation in the output quality of image data that has been filed.

Further features of the present invention will become apparent from the following description of exemplary embodiments with reference to the attached drawings.

BRIEF DESCRIPTION OF THE DRAWINGS

FIG. 23 is a diagram illustration an example of input file information and block information regarding attributes when object splitting has been performed.

FIG. 25 is a diagram showing a document tree structure.

DESCRIPTION OF THE EMBODIMENTS

Embodiment 1

Figure 1:
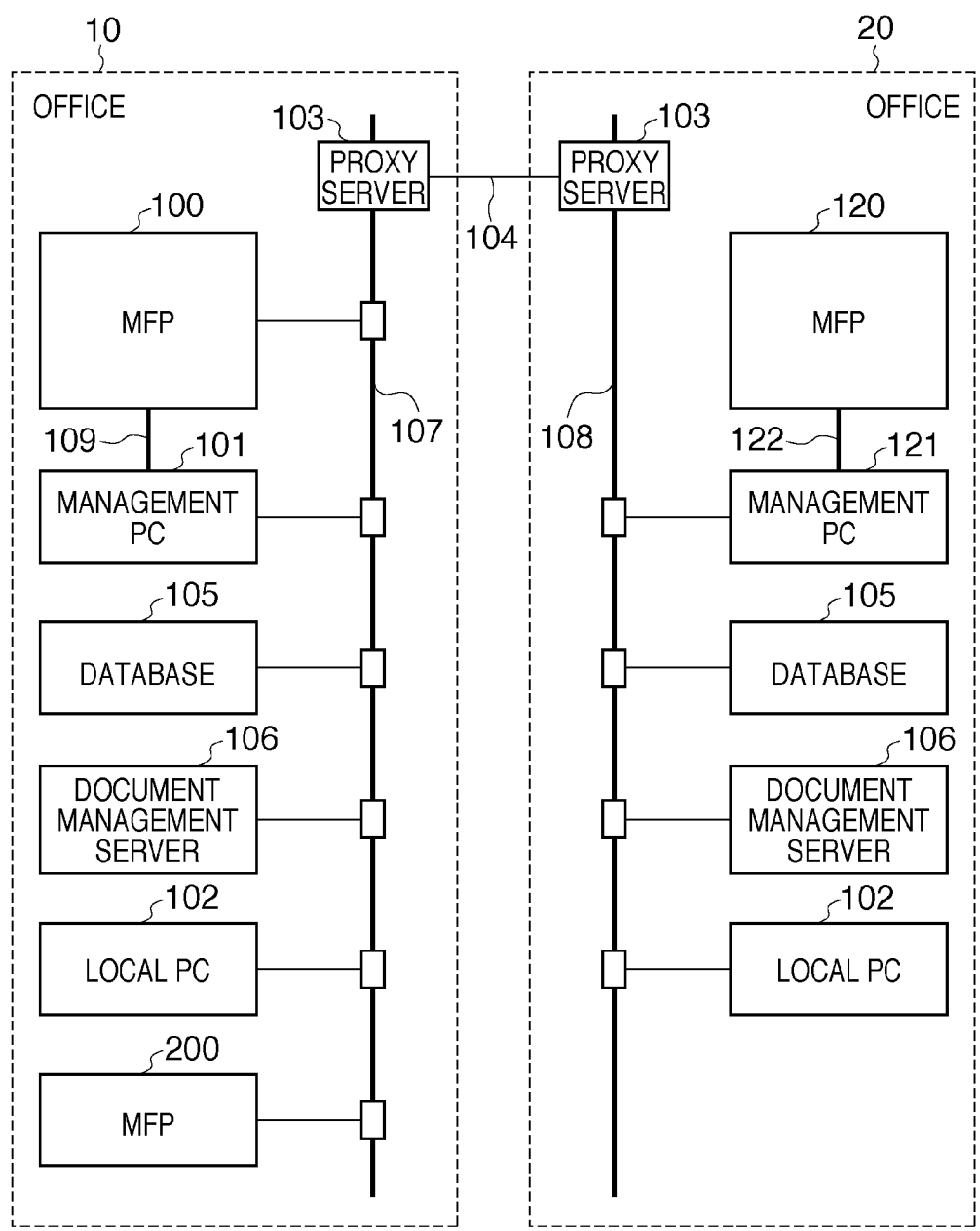
FIG. 1 is a block diagram showing an image processing system according to the present invention.
Figure 2:
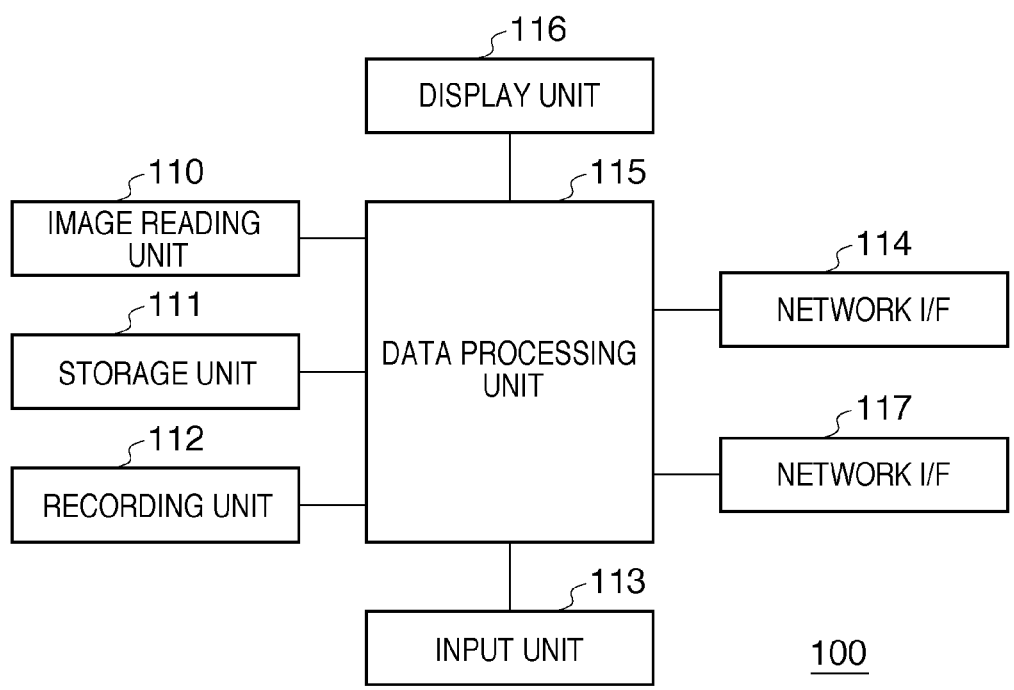
FIG. 2 is a block diagram showing an MFP.

Next is a description of Embodiment 1 of an image processing method according to the present invention with reference to the drawings. FIG. 1 is a block diagram showing an image processing system according to the present invention, and FIG. 2 is a block diagram showing an MFP in FIG. 1.

Image Processing System

In FIG. 1, the image processing system according to the present invention is used in an environment in which an office 10 provided with a LAN 107 is connected via the Internet 104 to an office 20 provided with a LAN 108.

Connected to the LAN 107 are a multifunction peripheral (MFP) 100 that is a recording apparatus, a management PC 101 that controls the MFP 100, a local PC 102, a document management server 106, and a database 105 for the document management server 106.

Connected to the LAN 108 are an MFP 120 that is a recording apparatus, a management PC 121 that controls the MFP 120, a document management server 106, and a database 105 for the document management server 106.

A proxy server 103 is connected to the LAN 107 and LAN 108, and the LAN 107 and LAN 108 are connected to the Internet 104 via the proxy server 103. An intranet using a leased line or the like may be employed in place of the Internet 104.

The MFP 100 handles part of image processing performed on an input image read from a document. The MFP 100 has a function for inputting image data, which is the processing result, to the management PC 101 via the LAN 107. The MFP 100 also functions as a printer for interpreting PDL data (also called print data) that is described in a page description language (hereinafter, "PDL") and has been transmitted from the local PC 102 or a general-purpose PC not shown in FIG. 1, and printing an image defined by the print data. Furthermore, the MFP 100 has a function for transmitting an image read from a document to the local PC 102 or the general-purpose PC not shown in FIG. 1. The management PC 101 is an ordinary computer including an image storage unit, an image processing unit, a display unit, an input unit, and the like, and functionally-speaking, part of these constituent elements are integrated with the MFP 100 and are constituent elements of the image processing system. Note that in the present embodiment, although the registration processing etc. described below is executed in the database 105 via the management PC, the processing performed by the management PC may be executed by the MFP. It should also be noted that the image storage unit is a storage, or the like, the image processing unit is image processing software, image processing hardware, or the like, and the display unit is a display, a display driver, or the like. The input unit is a keyboard, a pointing device, another data input device, or the like.

The local PC is a computer used by a user, and functions as a client terminal that requests a service from the document management server 106 or MFP 100 and receives the service.

The MFP 120 and an MFP 200 have the same functions as the MFP 100. Also, a management PC 121 has the same functions as the management PC 101. Furthermore, the MFP 100 is directly connected to the management PC 101 via a LAN 109. Similarly, the MFP 120 is directly connected to the management PC 121 via a LAN 122. Note that the MFP 100 and MFP 120 differ with respect to the content of image processing realized by later-described data processing units 115. Also, the MFP 200 is an MFP to which the present invention has been applied, and also differs with respect to the content of image processing.

MFP

In FIG. 2, the MFP 100 includes an image reading unit 110 that has an automatic document feeder (hereinafter, referred to as an "ADF") that is not shown in FIG. 2. The image reading unit 110 irradiates light onto a document placed on a document platen, and causes an image on the document to be formed on a solid-state imaging device with use of a lens. The solid-state imaging device outputs image reading signals in accordance with the brightness of light received by elements therein, the signals are digitized, and image data having a predetermined resolution (e.g., 600 dpi) and a predetermined number of brightness levels (e.g., 8 bits) is generated. The image data is, for example, bitmap image data (raster data) in a raster format.

The MFP 100 has a storage unit (hereinafter, called a "BOX") 111 and a recording unit 112, and in a case of executing an ordinary copying function, the MFP 100 converts image data into recording data by performing copying image processing thereon with use of the data processing unit 115. In a case of making a plurality of copies, recording data corresponding to one page is temporarily held in the BOX 111 and thereafter sequentially output to the recording unit 112, and recording images are formed on recording sheets.

The MFP 100 has a network I/F 114 for connecting to the LAN 107, and can record, with use of the recording unit 112, PDL data that has been output from the local PC 102 or other general-purpose PC (not shown) with use of a driver. The PDL data output from the local PC 102 via the driver is input from the LAN 107 to the data processing unit 115 via the network I/F 114. The PDL data is converted to a recordable recording signal by being interpreted and processed by the data processing unit 115, and is recorded onto a recording sheet as a recording image by the recording unit 112.

The BOX 111 has a function for storing data obtained by rendering data from the image reading unit 110 or PDL data that has been output from the local PC 102 via the driver. This function is not limited to making a plurality of copies as described above, but rather print data is also stored in the BOX in a case such as where input or an instruction that explicitly instructs the storage of a document has been received from the user.

The MFP 100 is operated through a key operation unit (input unit 113) provided in the MFP 100, or the input unit (keyboard, pointing device, or the like) of the management PC 101. The data processing unit 115 includes a control unit (not shown) by which predetermined control is executed for such operations.

The MFP 100 includes a display unit 116 by which the status of operation input and image data to be processed can be displayed.

The BOX 111 can be directly controlled from the management PC 101 via a network I/F 117. The LAN 109 is used for the transfer of data and control signals between the MFP 100 and the management PC 101.

Structure of a General Data Processing Unit

Figure 3:
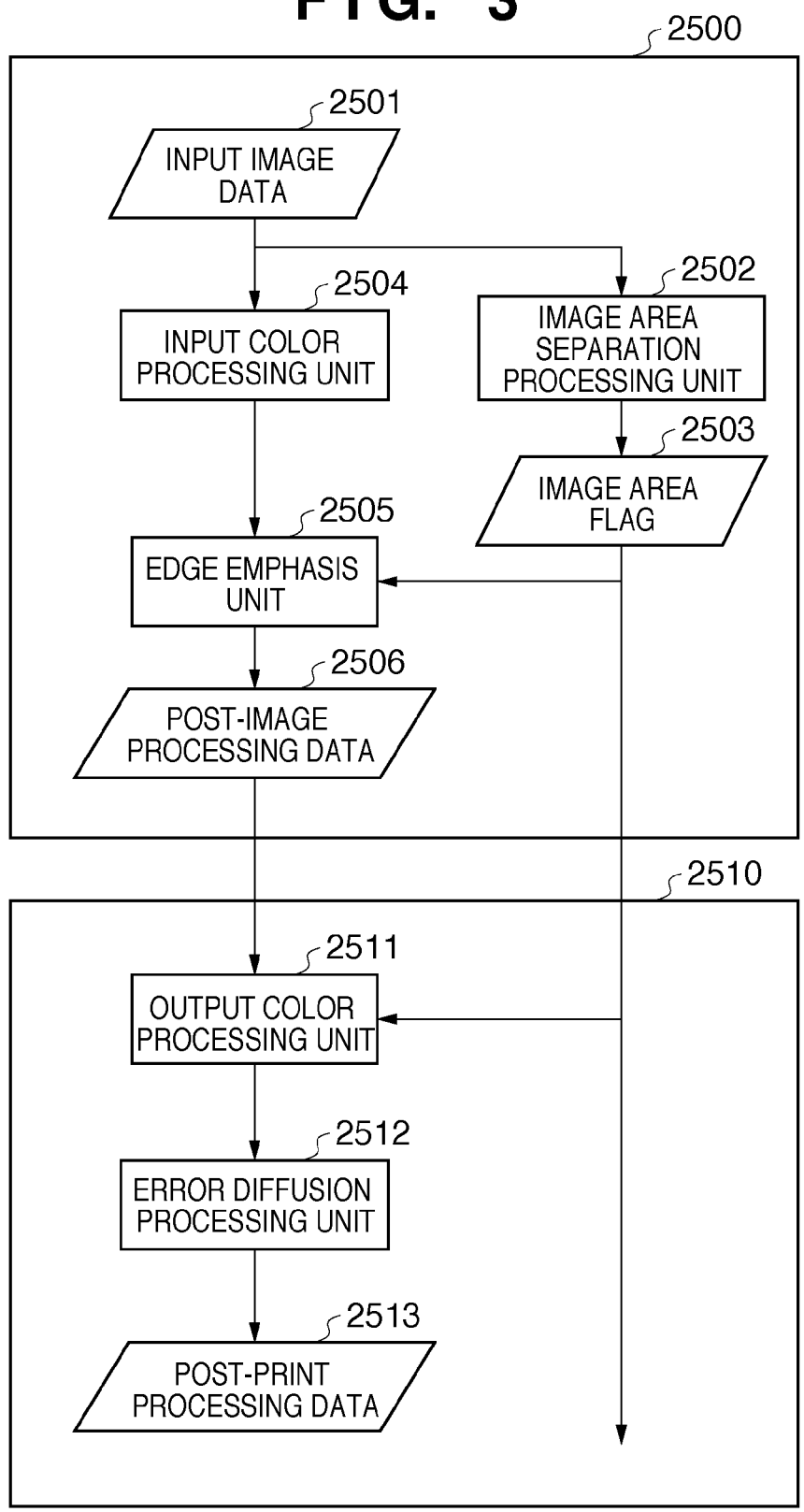
FIG. 3 is a diagram illustrating an example of MFP image processing described in an embodiment.
Figure 4:
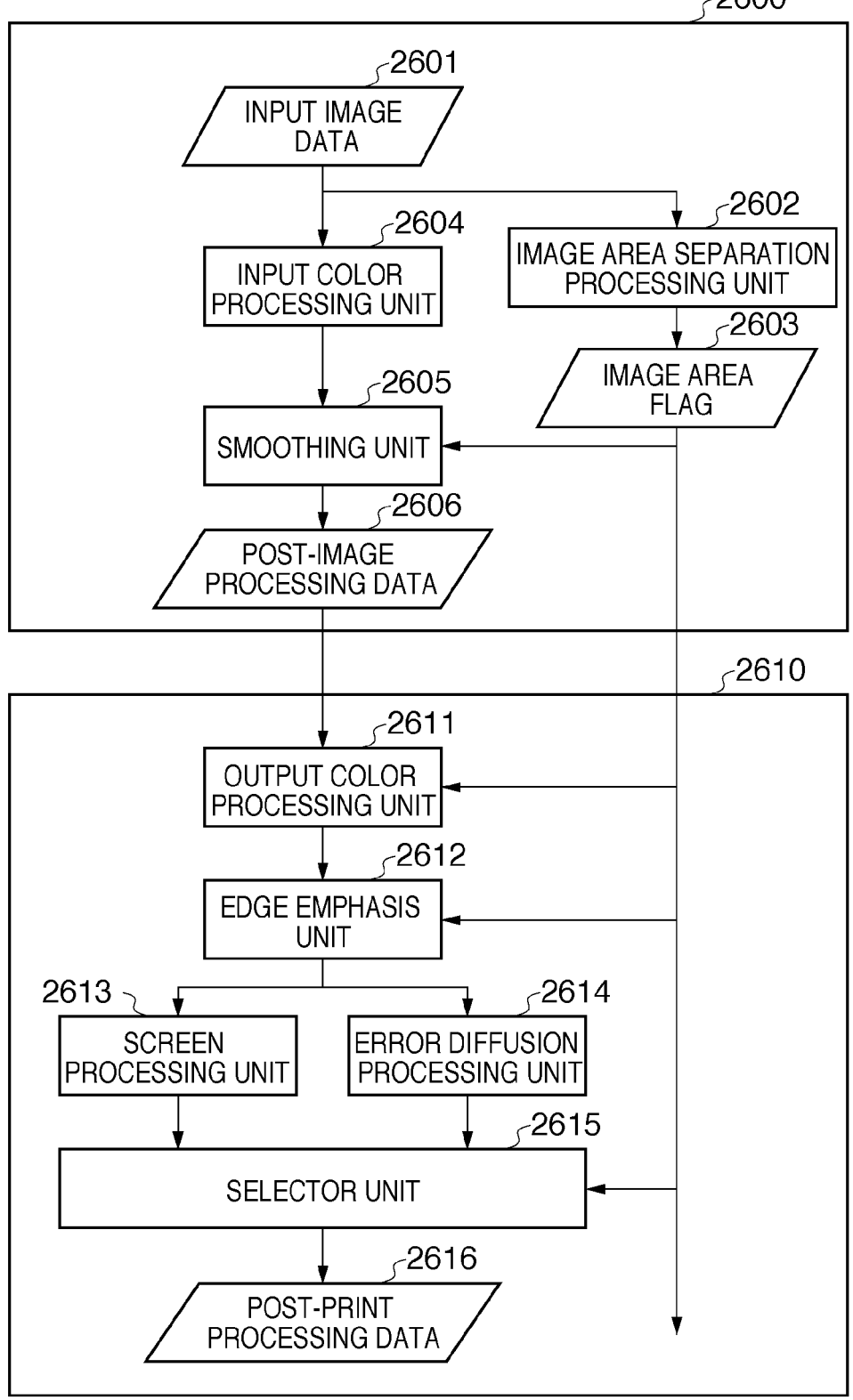
FIG. 4 is a diagram illustrating an example of MFP image processing described in an embodiment.

The following describes the structure of the data processing unit 115 shown in FIG. 2 that is included in the MFP 100, in a case of performing image processing to which the present invention has not been applied, with reference to FIG. 3 and FIG. 4.

In FIG. 3, input image data 2501 that has been read by the image reading unit 110 is input to the data processing unit 115, which performs scan image processing 2500 thereon. First, the input image data 2501 is input to an image area separation processing unit 2502. For each pixel, the image area separation processing unit 2502 generates an image area flag 2503 indicating an image characteristic of the pixel. At the same time, the input image 2501 is input to an input color processing unit 2504. The input color processing unit 2504 performs commonly-known tone correction, color conversion, and the like. The image data processed by the input color processing unit 2504 is input to an edge emphasis unit 2505. For each pixel, the edge emphasis unit 2505 switches the level of edge-emphasizing for character areas and other portions (halftone areas and photograph areas) in accordance with the image area flags 2503 generated by the image area separation processing unit 2502, and generates post-scan image processing data 2506. The post-scan image processing data 2506 is temporarily stored in the storage unit 111. Note that the image area flags 2503 are similarly stored in the storage unit 111.

Thereafter, the data processing unit 115 converts the post-scan image processing data 2506 as necessary into a data format that can be output by the recording unit 112. This processing is called print processing 2510. The post-scan image processing data 2506 stored in the storage unit 111 is input to an output color processing unit 2511. The output color processing unit 2511 performs commonly-known image processing such as tone correction and color space conversion in conformity with the characteristics of the recording unit 112. At this time, color processing and the like is generally changed for character areas and other portions (halftone areas and photograph areas) in accordance with the image area flags 2503 that have been read from the storage unit 111. This is because, in particular, it is desirable to output black character areas in black monochrome. The data that has been color processed by the output color processing unit 2511 is input to an error diffusion processing unit 2512. Here, post-print processing data 2513 for output by the recording unit 112 is generated. The post-print processing data 2513 is sent to the recording unit 112 and printed on an output sheet or the like. This completes the description of the MFP 100 shown in FIG. 3.

Structure of Image Area Separation Processing

Figure 8:
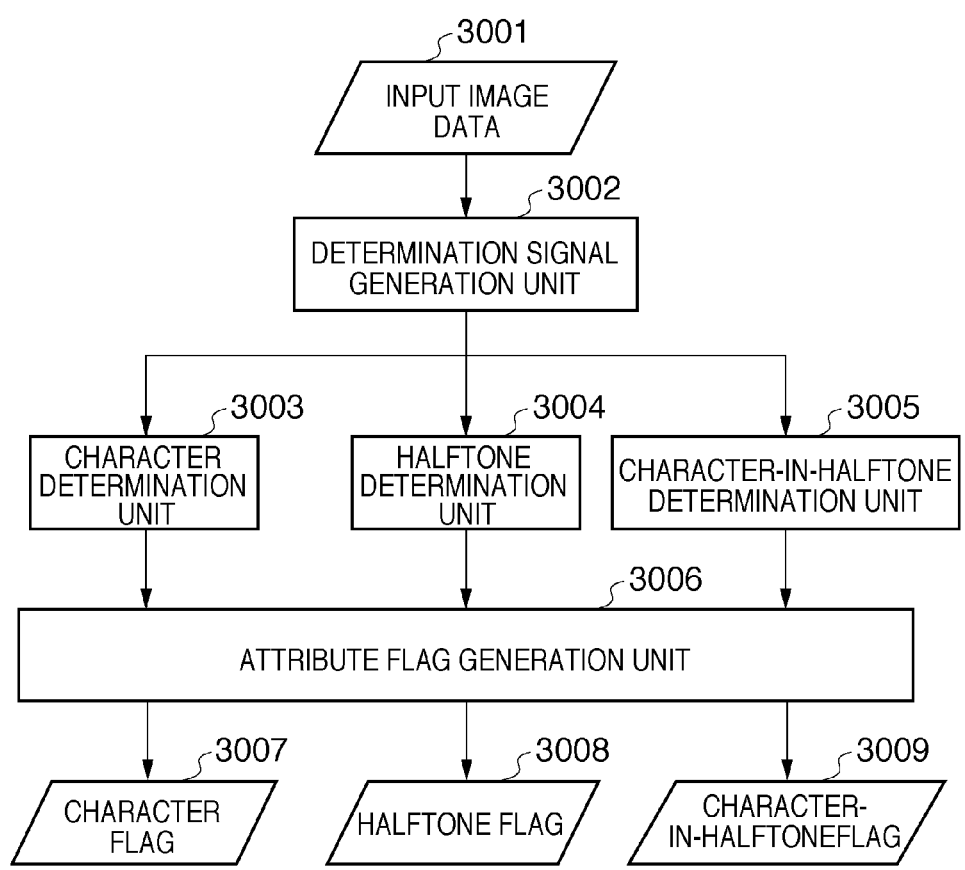
FIG. 8 is a diagram illustrating image area separation processing in MFP image processing described in Embodiment 1.

The following describes the image area separation processing unit 2502 with reference to FIG. 8. Input image data 3001 is input to a determination signal generation unit 3002. The input image data is image data targeted for processing, and is also called "targeted image data", "image data of interest" and the like. For example, if the input image data is an RGB signal (8-bits), a grayscale signal (8 bits) is generated. At this time, exclusively the G channel may be extracted from the RGB signal or obtained by a calculation such as (R+2×G+B)/4. The number of channels in and bit rate of the input image data is not limited to the above examples. Also, the above description of the determination signal generation method, number of channels and bit rate is merely one example.

The determination signal generated by the determination signal generation unit 3002 is input to a character determination unit 3003, a halftone determination unit 3004 and a character-in-halftone determination unit 3005, which respectively perform a halftone determination, a character determination, and a character-in-halftone determination thereon. An attribute flag generation unit 3006 performs a comparison calculation on the results of the above determinations and generates attribute flags. In the present embodiment, a character flag 3007, a halftone flag 3008 and a character-in-halftone flag 3009 are generated. Based on these attributes flags, image processing that is most suited to the characteristics of the images included in the document image is performed. An attribute flag is generated for each pixel, and bitmap attribute data is generated in correspondence with bitmap image data.

Figure 9:
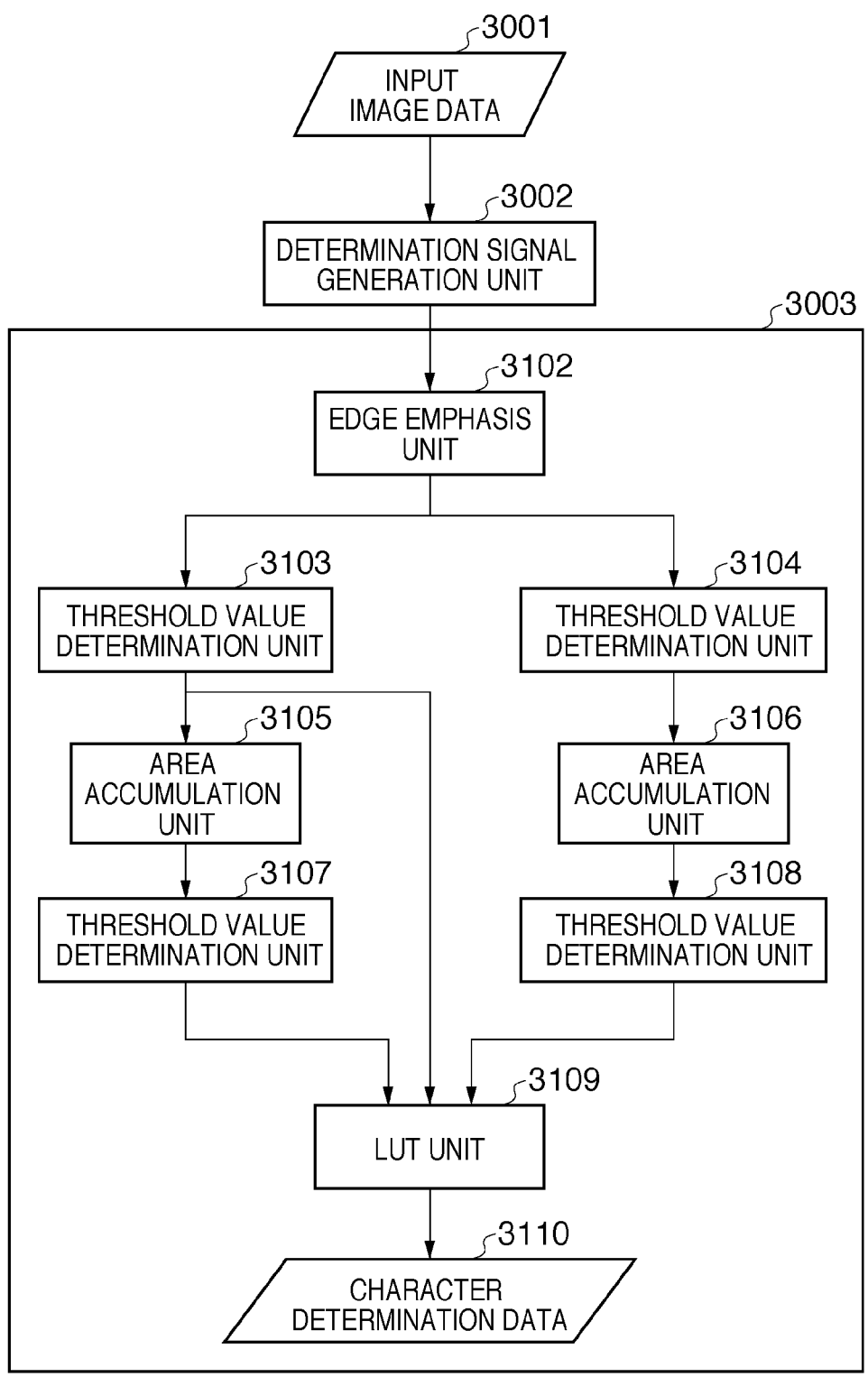
FIG. 9 is a diagram illustrating image area separation processing in MFP image processing described in Embodiment 1.

Next is a description of the character determination unit 3003 with reference FIG. 9. The input image data 3001 is converted into a predetermined determination signal by the determination signal generation unit 3002, and thereafter edge-emphasized by an edge emphasis unit 3102. In this case, the edge emphasis unit 3102 performs digital filter processing that emphasizes and extracts a desired frequency component of the image data. A representative example is a quadratic differential filter such as a Laplace filter.

Edge-emphasized signals output from the edge emphasis unit 3102 are input to a threshold value determination unit 3103 and a threshold value determination unit 3104. A positive threshold value is set in the threshold value determination unit 3103, and a negative threshold value is set in the threshold value determination unit 3104.

If a quadratic differential filter is used, filtered signal values have positive and negative coding, and in a case where the image signal is a brightness signal as in the present embodiment, values inside a character are positive, and values outside a character are negative. Accordingly, the threshold value determination unit 3103 outputs an inner edge signal when it is determined that the edge-emphasized signal exceeds the positive threshold value, and the threshold value determination unit 3104 outputs an outer edge signal when it is determined that the edge-emphasized signal falls below the negative threshold value.

The inner edge signal output from the threshold value determination unit 3103 is input to an area accumulation unit 3105, and the outer edge signal output from the threshold value determination unit 3104 is input to an area accumulation unit 3106. The area accumulation units 3105 and 3106 add up determination signals of, for example, pixels in a 3×3 peripheral area that includes the pixel of interest.

A threshold value determination unit 3107 and a threshold value determination unit 3108 compare a threshold value and output results from the area accumulation units 3105 and 3106 respectively, and output a determination result. For example, if each of the threshold values is set to "2", the threshold value determination unit 3107 outputs a determination signal "1" "when two or more pixels determined to be an inner edge exist in a 3×3 peripheral area of the pixel of interest". Similarly, the threshold value determination unit 3108 outputs a determination signal "1" "when two or more pixels determined to be an outer edge exist in a 3×3 peripheral area of the pixel of interest".

Figure 17:
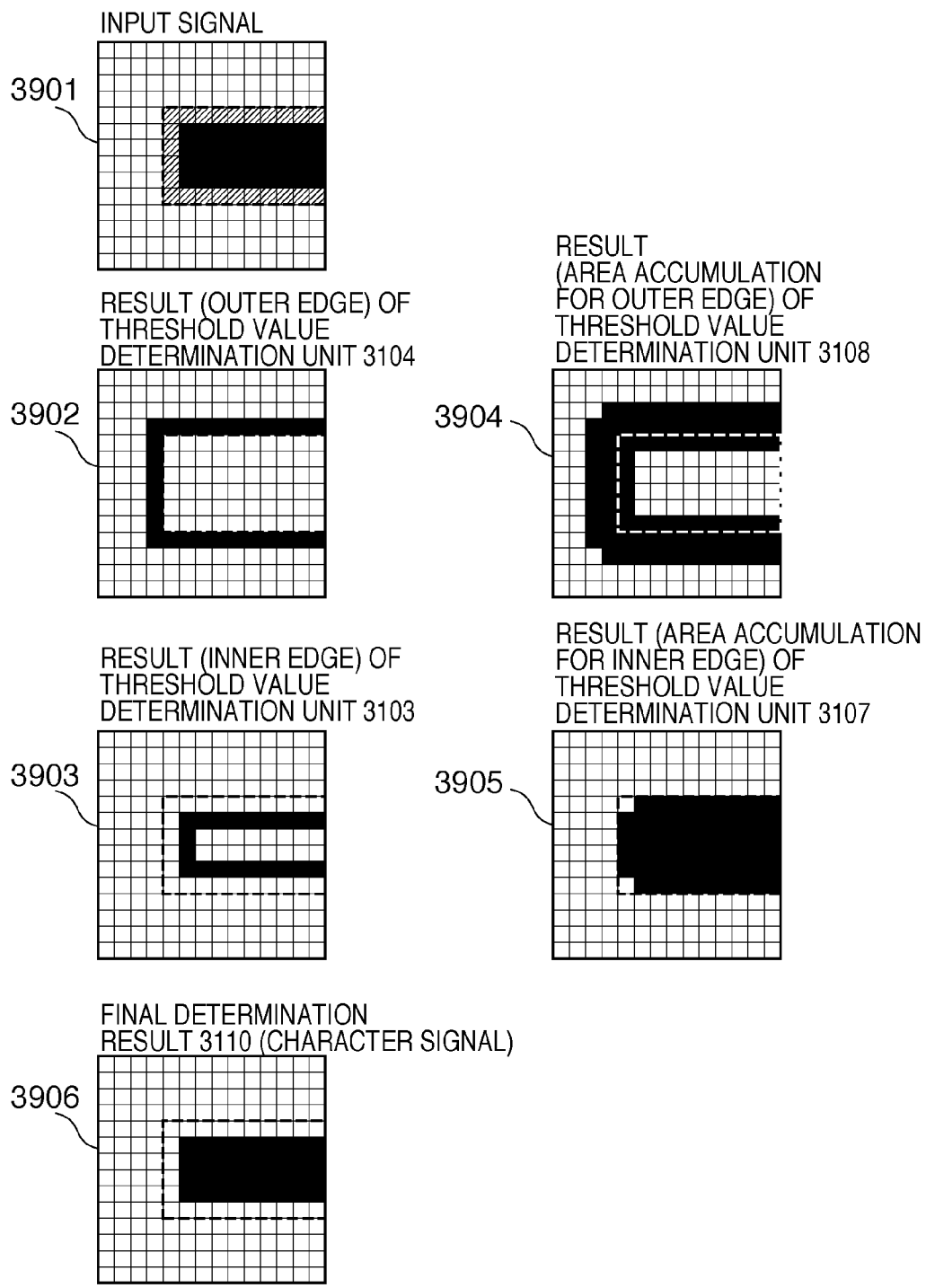
FIG. 17 is a diagram illustrating image area separation processing in MFP image processing described in an embodiment.

Examples of the determination results are shown in FIG. 17. An input signal (image data) 3901 represents part of a character edge on a white ground. The input image data 3901 is edge-emphasized (3102), and the result of the threshold value processing performed by the threshold value determination unit 3104 is an outer edge signal 3902. The outer side of the character edge has been extracted. The outer edge signal 3902 is accumulated by the area accumulation unit 3106, and the result of the threshold value processing performed by the threshold value determination unit 3108 is an outer edge accumulation signal 3904. The outer edge signal 3902 has been expanded.

The input image data 3901 is edge-emphasized (3102), and the result of the threshold value processing performed by the threshold value determination unit 3103 is an inner edge signal 3903. The inner side of the character edge has been extracted. The inner edge signal 3903 is accumulated by the area accumulation unit 3105, and the result of the threshold value processing performed by the threshold value determination unit 3107 is an inner edge accumulation signal 3905. The inner edge signal 3903 has been expanded.

Signals from the threshold value determination units 3103, 3107 and 3108 are input to a LUT unit 3109. The LUT unit 3109 plays the role of outputting a determination result in accordance with predetermined logic based on the output results from the threshold value determination units. An example of the predetermined logic is described below. Note that the condition is on the left side of the arrow, and the value of the determination result that is given in correspondence to the pixel of interest is on the right side of the arrow.

(1) Pixel of interest is an inner edge→1
(2) Not (1), and two or more pixels that are an outer edge exist in a 5×5 peripheral area of the pixel of interest→0
(3) Not (1) or (2), and two or more pixels that are an inner edge exist in a 5×5 peripheral area of the pixel of interest→1
(4) Does not correspond to any of (1) to (3)→0

Figures 18, 19:
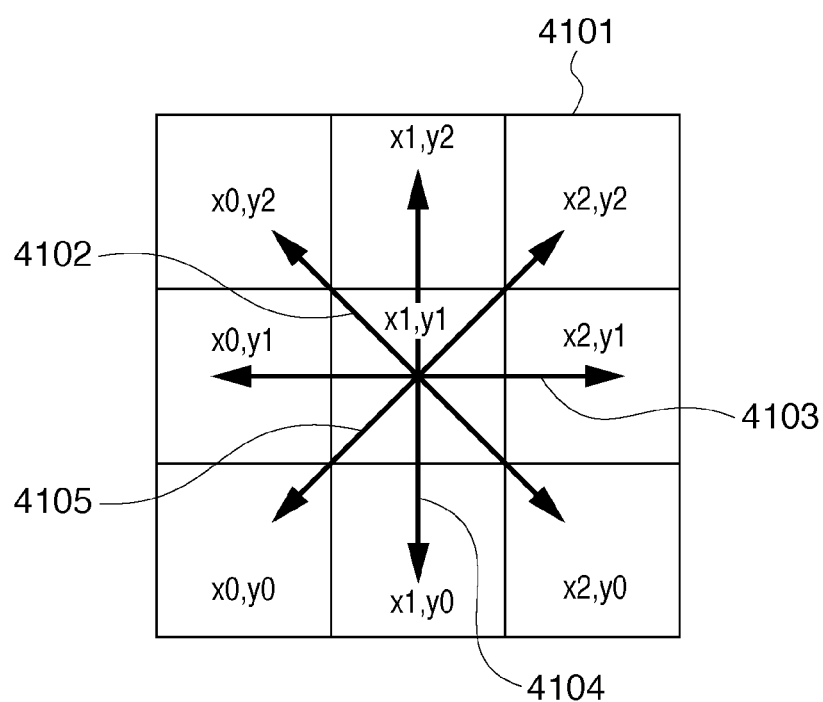
FIG. 18 is a diagram illustrating image area separation processing in MFP image processing described in an embodiment.
FIG. 19 is a diagram illustrating a method for calculating a gradient of signal value of a pixel, which is described in an embodiment.

When represented by a LUT, the above logic can be expressed as a table 4001 shown in FIG. 18. A character edge determination (bottom row) is determined according to the results of the inner edge determination, the area accumulation determination for the inner edge determination, and the area accumulation determination for the outer edge determination. The above enables suitably extracting character edges.

Figure 10:
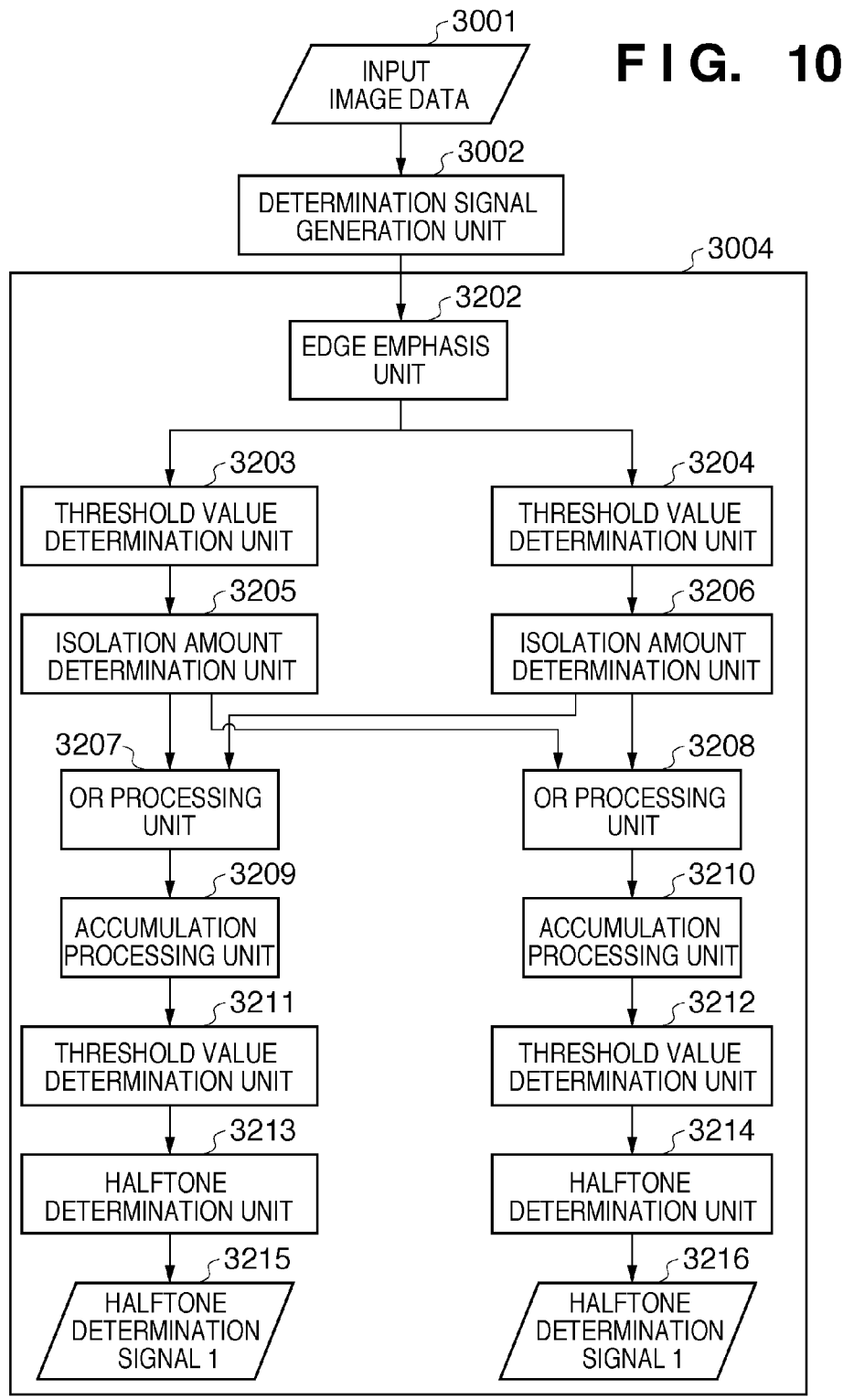
FIG. 10 is a diagram illustrating image area separation processing in MFP image processing described in Embodiment 1.

The following describes the halftone determination unit 3004 with reference to FIG. 10. The input image data 3001 is converted into a predetermined determination signal by the determination signal generation unit 3002, and thereafter edge-emphasized by an edge emphasis unit 3202. In this case, the edge emphasis unit 3202 performs digital filter processing that emphasizes and extracts a desired frequency component of the image data. A representative example is a quadratic differential filter such as a Laplace filter.

An edge-emphasized signal output from the edge emphasis unit 3202 is input to a threshold value determination unit 3203 and a threshold value determination unit 3204. A positive threshold value is set in the threshold value determination unit 3203, and a negative threshold value is set in the threshold value determination unit 3204.

If a quadratic differential filter is used, filtered signal values have positive and negative coding, and in a case where the image signal is a brightness signal as in the present embodiment, values inside a halftone area are positive, and values outside a halftone area are negative. Accordingly, the threshold value determination unit 3203 outputs an inner edge signal when it is determined that the edge-emphasized signal exceeds the positive threshold value, and the threshold value determination unit 3204 outputs an outer edge signal when it is determined that the edge-emphasized signal falls below the negative threshold value.

The inner edge signal output from the threshold value determination unit 3203 is input to an isolation amount determination unit 3205. The outer edge signal output from the threshold value determination unit 3204 is input to an isolation amount determination unit 3206.

The isolation amount determination unit 3205 performs pattern matching processing for the inner edge signal. Halftone documents can range from a low screen ruling to a high screen ruling, and therefore the halftone dot size and interval differ depending on the document. For this reason, pattern matching is performed with use of a plurality of patterns in order to enable detection regardless of the halftone screen ruling. For low screen ruling halftone dots, a large pattern is used in matching to detect whether an area is a halftone area. For high screen ruling halftone dots, a small pattern is used in matching to detect whether an area is a halftone area. The shape of halftone dots varies depending on density, an in order to accommodate this, various levels of matching may be provided. In other words, it is desirable to be able to determine halftone dots even if there is not a complete match with a pattern. In this case, the pattern matching result is output at HIGH or LOW. Note that known technology may be used to achieve the pattern matching processing, and the present invention is not limited to the above description. The isolation amount determination units 3205 and 3206 perform isolation amount determination on the inner edge signal and outer edge signal respectively, and output a high screen ruling determination signal or a low screen ruling determination signal as an isolation amount determination result.

For example, the isolation amount determination units 3205 and 3206 output the high screen ruling determination signal to an OR processing unit 3207 and the low screen ruling determination signal to an OR processing unit 3208. For this reason, a high screen ruling halftone area is detected in processing performed by the OR processing unit 3207 onward, and a low screen ruling halftone area is detected in processing performed by the OR processing unit 3208 onward. The OR processing units 3207 and 3208 perform a HIGH/LOW OR operation on isolation amount determination signals in a 3×3 peripheral area of the pixel of interest, and if even one pixel is HIGH, output an OR signal in which the isolation amount determination signal value of the pixel of interest is HIGH.

OR processed OR signals are input to accumulation processing units 3209 and 3210, and output therefrom as accumulation signals. For example, the accumulation processing units 3209 and 3210 accumulate post-OR processing OR signals with use of a plurality of areas. For example, the accumulation processing unit 3209 performs accumulation with use of an 11×11 area, and the accumulation processing unit 3210 performs accumulation with use of a 21×21 area. Different sizes are used to accommodate the halftone screen rulings, and the lower the halftone screen ruling, the larger the area that is used. Of course other sizes may be used.

Next, threshold value determination units 3211 and 3212 perform threshold value determination processing on the accumulation signals obtained by the accumulation processing, and thereafter halftone determination units 3213 and 3214 determine whether the area is a halftone area and output a halftone signal 1 (3215) and a halftone signal 2 (3216) respectively. The threshold value determination units 3211 and 3212 perform threshold value determination processing on the accumulated signals. The threshold values used here can be set for each screen ruling. For example, threshold values are considered to be set to "20" in the threshold value determination unit 3211. The threshold value determination unit 3211 outputs a determination signal "1" "when 20 or more pixels determined to be isolated points corresponding to a high screen ruling exist in an 11×11 area". Similarly, threshold values is considered to be set to "40" in the threshold value determination unit 3212. The threshold value determination unit 3212 outputs a determination signal "1" for the pixel of interest "when 40 or more pixels determined to be isolated points corresponding to a low screen ruling exist in a 21×21 area". These output signals are halftone determination signals for each screen ruling.

The halftone determination units 3213 and 3214 perform halftone determination based on signals for the areas, which were output from the threshold value determination units 3211 and 3212 respectively, and output the halftone determination signal 1 (3215) and halftone determination signal 2 (3216). Note that the above-described processing performed by the threshold value determination units may be performed here.

Figure 11:
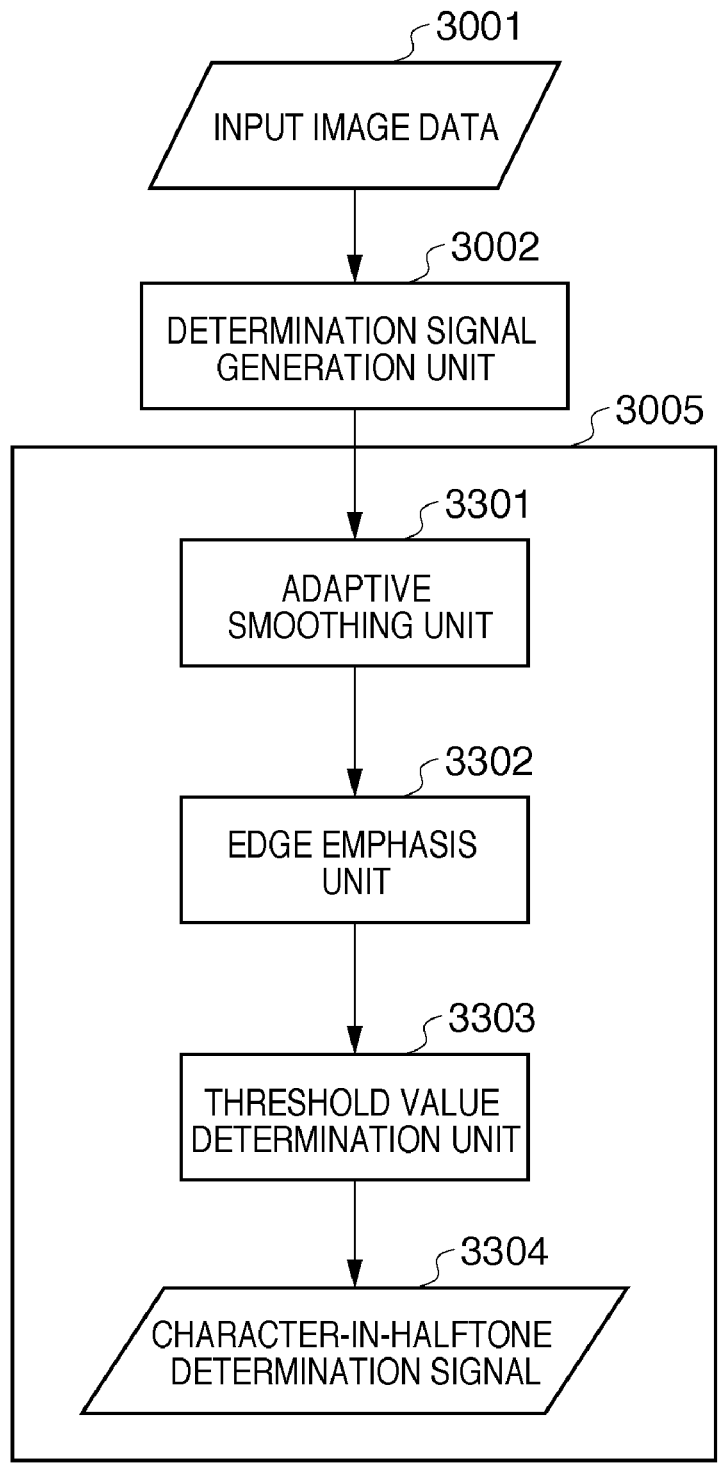
FIG. 11 is a diagram illustrating image area separation processing in MFP image processing described in Embodiment 1.

The following describes the character-in-halftone determination unit 3005 with reference to FIG. 11. The input image data 3001 is converted into a predetermined determination signal by the determination signal generation unit 3002, and thereafter adaptively smoothened by an adaptive smoothing unit 3301. Here, the adaptive smoothing unit 3301 performs digital filter processing for smoothing a desired frequency component of image data while adaptively excluding characters and thin lines.

The smoothened signal output from the adaptive smoothing unit 3301 is edge-emphasized by an edge emphasis unit 3302. In this case, the edge emphasis unit 3302 performs digital filter processing that emphasizes and extracts a desired frequency component of the image data. A representative example is a quadratic differential filter such as a Laplace filter.

An edge-emphasized signal output from the edge emphasis unit 3302 is input to a threshold value determination unit 3303. A positive threshold value is set in the threshold value determination unit 3303.

If a quadratic differential filter is used for edge-emphasis, filtered signal values have positive and negative coding, and in a case where the image signal is a brightness signal as in the present embodiment, values inside a character are positive, and values outside a character are negative.

In the character-in-halftone determination, extracting a character itself that is in a halftone area is the object, and therefore the outer edge of the character is considered to be a halftone area, and the inner edge of the character is extracted, thereby obtaining a character in a halftone area. Accordingly, a positive threshold value is set in the threshold value determination unit 3303, and an inner edge signal is considered to be output if the positive threshold value has been exceeded.

The attribute flag generation unit 3006 generates attribute flags based on the character determination result obtained by the character determination unit 3003, the halftone determination result obtained by the halftone determination unit 3004, and the character-in-halftone determination result obtained by the character-in-halftone determination unit 3005. The following are examples of generating attribute flags based on the above results.

(1) Halftone signal: HIGH, Character signal: LOW→Image attribute: halftone
(2) Halftone signal: LOW, Character signal: HIGH→Image attribute: character
(3) Halftone signal: HIGH, Character-in-halftone signal: HIGH→Image attribute: character-in-halftone In a case other than the above, the image attribute is set to "image" (dot image). Performing determination as described above enables controlling, according to the image attribute, the amount of edge emphasizing and various types of image processing methods such as a color reproduction method and an image formation method. Note that in this image area separation, the character attribute is given to an image that is not a character but includes thin lines similarly to a character, that is to say, a line drawing. In other words, in the above description, the concept of a "character" includes a line drawing. This completes the description of the image area separation processing unit.

As a result, in the structure shown in FIG. 3, character (and line drawing) areas are edge-emphasized by the edge emphasis unit 2505.

MFP Performing Other Image Processing

In a case where more than one MFP constituting the above image processing system is used in a network environment such as shown in FIG. 1, the data processing units 115 of the MFP 100 and MFP 120 do not necessarily have the exact same processing structure. FIG. 4 shows an example of a structure that is different from the structure shown in FIG. 3. FIG. 4 shows an example of the MFP 120.

Input image data 2601 that has been read by the image reading unit 110 is input to the data processing unit 115, which performs scan image processing 2600 thereon. First, the input image data 2601 is input to an image area separation processing unit 2602. For each pixel, the image area separation processing unit 2602 generates an image area flag 2603 indicating an image characteristic of the pixel. At the same time, the input image 2601 is input to an input color processing unit 2604. The input color processing unit 2604 performs commonly-known tone correction, color conversion, and the like.

The image data processed by the input color processing unit 2604 is input to a smoothing unit 2605. In the MFP 120, screen (dither) processing is performed in print processing 2610 that is described later. For this reason, in order to avoid interference with the screen processing, it is necessary to perform descreening processing (moire removal processing) on the image data in advance. Smoothing is performed as a means for achieving this. At this time, for each pixel, the level of smoothing is switched for character areas and other portions (halftone areas and photograph areas) in accordance with image area flags 2603 generated by the image area separation processing unit 2602. Smoothing is not performed on character areas since there is a desire to maintain sharpness. In this way, post-scan image processing data 2606 is generated. The post-scan image processing data 2606 is temporarily stored in the storage unit 111. Note that the image area flags 2603 are similarly stored in the storage unit 111.

Thereafter, the data processing unit 115 converts the post-scan image processing data 2606 as necessary into a data format that can be output by the recording unit 112. This processing is called the print processing 2610. The post-scan image processing data 2606 stored in the storage unit 111 is input to an output color processing unit 2611. The output color processing unit 2611 performs commonly-known image processing such as tone correction and color space conversion in conformity with the characteristics of the recording unit 112. At this time, color processing and the like is generally changed for character areas and other portions (halftone areas and photograph areas) in accordance with the image area flags 2603 that have been read from the storage unit 111. This is because, in particular, it is desirable to output black character areas in black monochrome. Next, the data obtained by the color processing performed by the output color processing unit 2611 is input to an edge emphasis unit 2612, and the level of edge emphasis is switched for each pixel in accordance with the image area flags 2603. In particular, a high level of emphasis is generally used for character areas in order to improve character reproducibility. The data that has been edge-emphasized by the edge emphasis unit 2612 is input to a screen processing unit 2613 and an error diffusion processing unit 2614. The screen processing unit 2613 performs screen processing on the image data. At the same time, the error diffusion processing unit 2614 performs error diffusion processing on the image data. The image data output from the screen processing unit 2613 and the image data output from the error diffusion processing unit 2614 are input to a selector unit 2615. The selector unit 2615 performs switching for each pixel in accordance with the image area flags 2603. Normally, error diffusion processing is selected for character areas, and screen processing is selected for other portions. The image data that is selected by the selector unit 2615 is considered to be post-print processing data 2616. The post-print processing data 2616 is sent to the recording unit 112 and printed on an output sheet or the like. This completes the description of the MFP 120 shown in FIG. 4.

Figure 5:
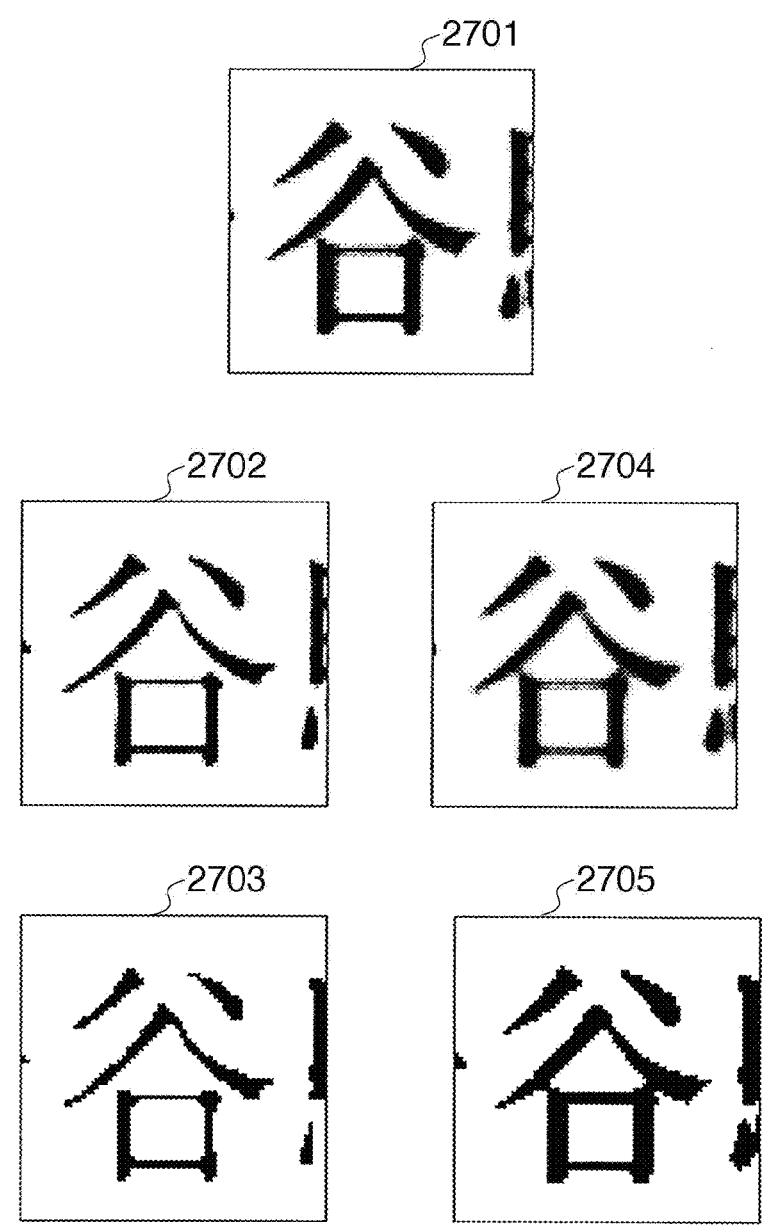
FIG. 5 is a diagram illustrating differences between character images that occur due to differences between the MFP image processing examples described in an embodiment.

When the two types of post-scan processing data 2506 and 2606 obtained by the scan processing performed by the MFPs (MFP 100 and MFP 120) that have different image processing structures are stored in a box with use of the processing described in FIG. 3, problems such as the following occur. These problems are described with reference to FIG. 5.

A character image 2701 corresponds to the input image data 2501 for the MFP 100 and the input image data 2601 for the MFP 120. The same image is used for both in this description. When the character image 2701 is processed by the MFP 100 (the structure shown in FIG. 3), the post-scan image processing data 2506 is a character image 2702. In the same way, when the character image 2701 is processed by the MFP 120 (the structure shown in FIG. 4), the post-scan image processing data 2606 is a character image 2704. The character image 2702 is an image in which the entire image has been edge-emphasized. In particular, the level of edge emphasis on the character is high. On the other hand, the character image 2704 is an image in which, in accordance with the image area flags 2603, processing has not been performed on the character area, and only portions excluding the character area, that is to say portions other than the character area, have been smoothened. For this reason, the noise component of the ground has been smoothened. As a result, there is an overall sense that the image is a little blurred. Next, the character images 2702 and 2704 are binarized. The results of the binarizing are shown in a character image 2703 and a character image 2705. The character image 2703 is the result of binarizing the character image 2702 that was edge-emphasized. The character image 2705 is the result of binarizing the character image 2704 in which processing was not performed on the character area, and the other portions were smoothened.

At this time, there is the problem that when the binarized character images 2703 and 2705 are compared, the characters differ in thickness. This problem occurs due to performing the same binarizing processing on an image that was edge-emphasized and an image that was not edge-emphasized. Since this binarized data is vectorized, ultimately there is the problem that the difference in thickness is present in the vectorized characters as well. In this example, binarizing is performed using the same fixed threshold value for the sake of the description. For this reason, the problem that the binarized characters differ in thickness occurs due to the difference in image processing before the binarizing.

Figure 6:
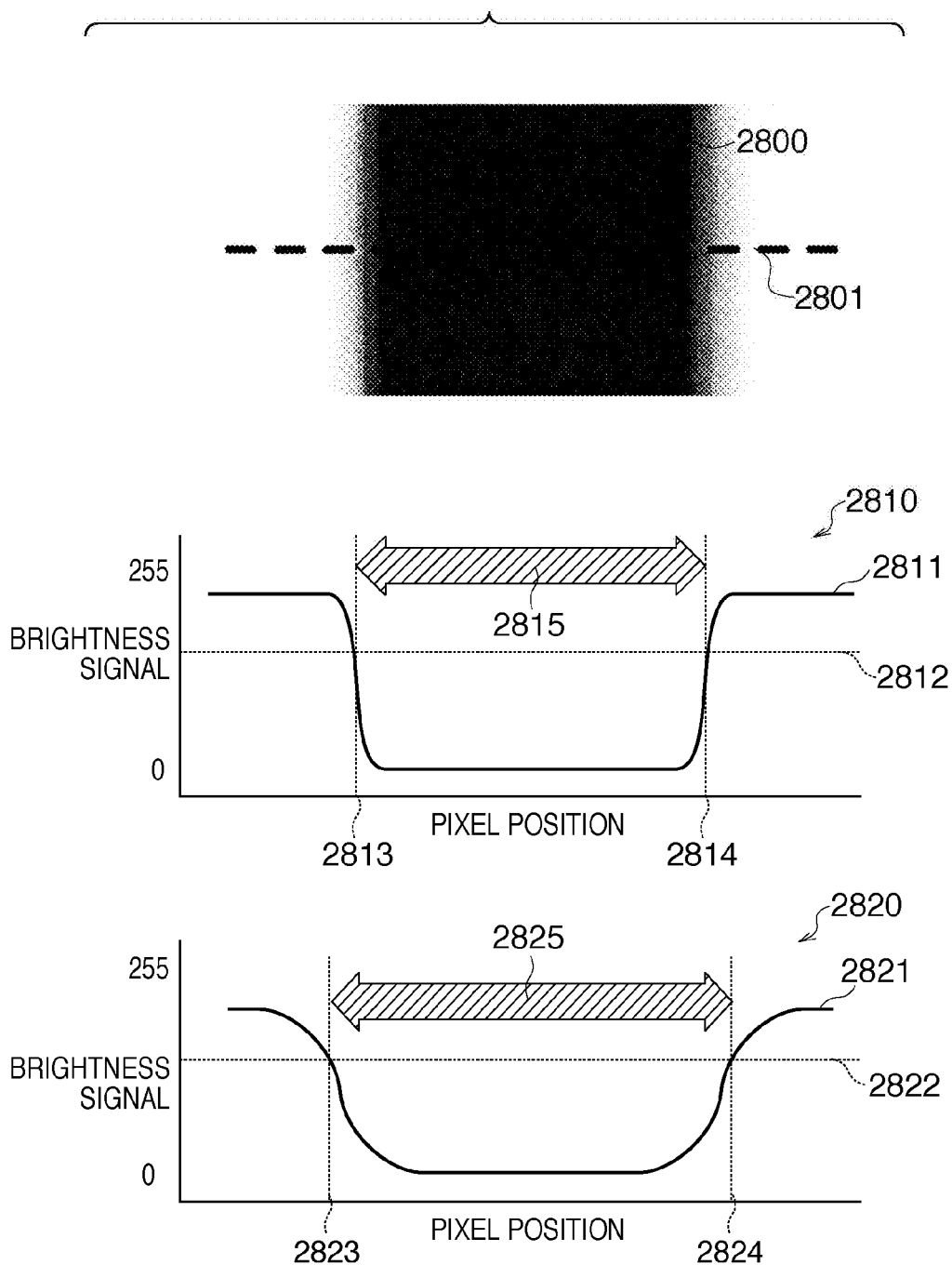
FIG. 6 is a diagram illustrating differences between character images that occur due to differences between the MFP image processing examples described in an embodiment.

This problem is illustrated diagrammatically in FIG. 6. A character edge image 2800 shows a cut-out portion of a character image. A graph 2820 shows a profile of signal values of the character edge image 2800 at a position 2801. A profile 2821 shows brightness signal values at pixel positions. Next, the same character edge image 2800 was edge-emphasized, and a graph 2810 shows a profile of signal values in the edge-emphasized character edge image 2800 at the position 2801. A profile 2811 shows brightness signal values at pixel positions. A comparison of the pixel value profiles 2811 and 2821 shows that the steepness of the signal variation at the edges of the character is different. Accordingly, when binarizing is performed using the same threshold values 2812 and 2822, the thickness of the binarized results is different. In this example, a width 2815 is the width of the result of binarizing the edge-emphasized character, that is to say, the width of the character. On the other hand, a width 2825 is the width of the result of binarizing the character that was not edge-emphasized, that is to say, the width of the character. These results clearly show the problem that the edge-emphasized character image and the character image that was not edge-emphasized differ with respect to the thickness of the binarized characters.

Here, document data (or image data) that is saved in the box of a MFP can be read out and printed by another MFP or printer. It is also possible for the document data to be vectorized and stored in a reusable format by another MFP or the like. In this case, image data stored in the box of the MFP 100 and image data stored in the box of the MFP 120 is printed or vectorized as character images of characters that have different thicknesses, even though the image data was read from the same document. In view of this, an MFP functioning as the image processing apparatus of the present embodiment has a structure and functions such as the following, thereby enabling reproducing characters that are similar to a document regardless of the MFP that document data was stored in.

MFP of the Present Embodiment

Figure 7:
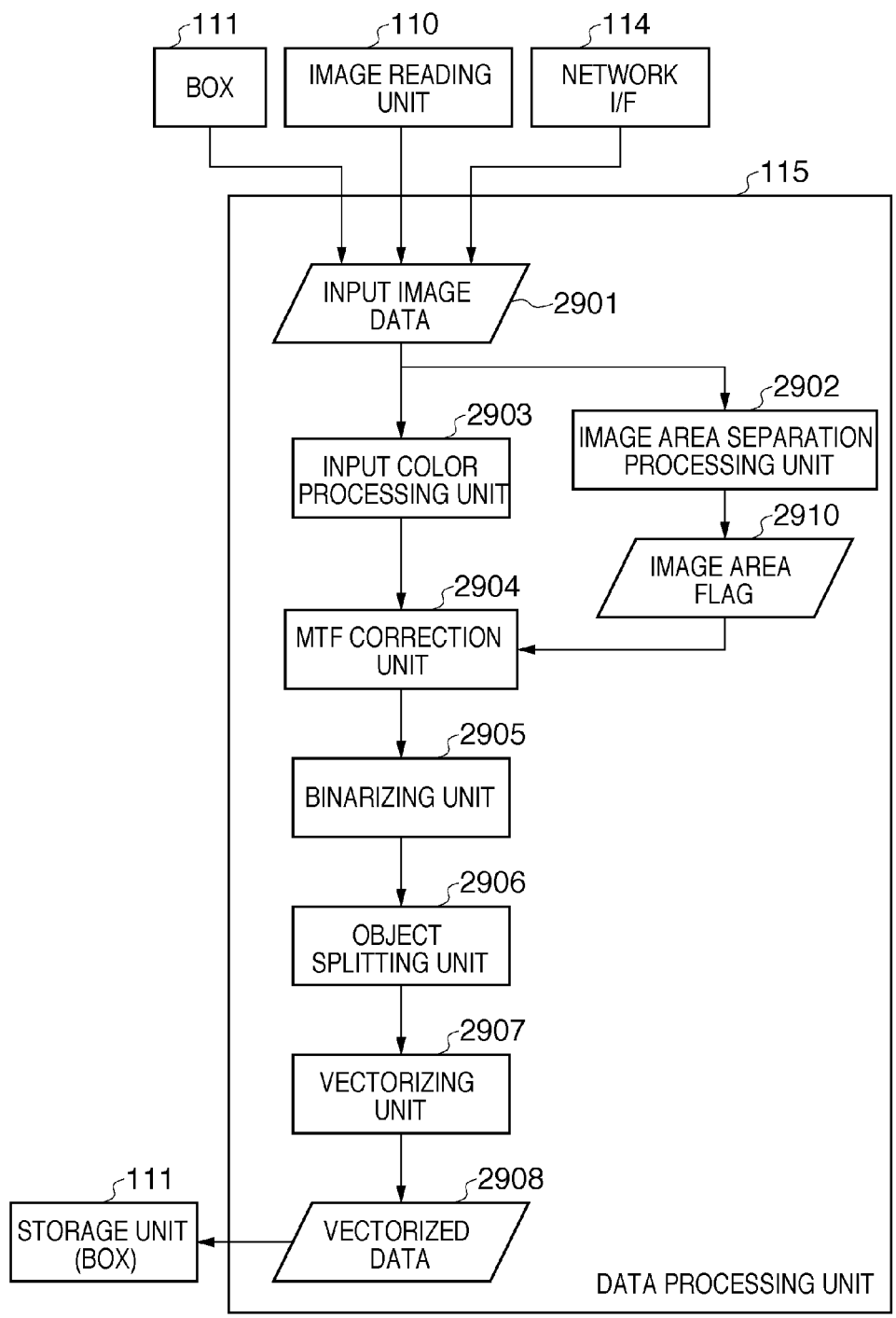
FIG. 7 is a diagram illustrating a structure of the present invention that is described in Embodiment 1.

FIG. 7 is a block diagram showing image processing functions of the data processing unit 115 of the MFP according to the present embodiment. This MFP is connected to the Internet 104, or to the LAN 107 or LAN 108.

Input image data 2901 is input to an image area separation processing unit 2902. Although the input image data 2901 may, for example, have been read by a scanner, in the case of image data on which image processing has already been performed by the MFP 100, MFP 120, or the like, character images are reproduced similarly to the original image data regardless of the image processing that was performed.

In FIG. 7, the image area separation processing unit 2902 performs the same processing as previously described. This processing enables detecting the characteristic of the input image, such as "character" or "halftone", for each pixel. In the same way, the input image data 2901 is input to an input color processing unit 2903. The input color processing unit 2903 performs commonly-known tone correction, color conversion, and the like. The image data processed by the input color processing unit 2903 is input to an MTF correction unit 2904.

At this time, the correction amount in MTF correction is changed for character areas and other portions in accordance with image area flags 2910 generated by the image area separation processing unit 2902. As previously described, edge-emphasizing is generally performed in order to raise the sharpness of characters and photos, but in the present embodiment, smoothing is performed by the MTF correction unit 2904 if the attribute flag is "character". The MTF correction unit 2904 can also be called a processing unit that converts the spatial frequency characteristics of image data. By performing normal processing on areas other than the character areas, for example, the image quality of a photograph area is maintained. Although the entirety of an image is smoothened in the prior art disclosed in the patent document, performing smoothing on the entirety of an image cannot be said to be appropriate in consideration of the reproducibility of image areas (photograph areas etc.).

The MTF corrected image data from the MTF correction unit 2904 is input to a binarizing unit 2905, which performs binarizing thereon. In the present embodiment, binarizing is performed using a predetermined fixed threshold value (fixed threshold value). In consideration of the fact that smoothing reduces the contrast of character edges, the fixed threshold value for binarizing is desirably set lower than normal for a brightness signal value.

A binary image generated by the binarizing unit 2905 is input to an object splitting unit 2906. In object splitting processing, image data is classified into rectangular areas according to the type of object included therein, examples of which include a character/photo, a graphic, and a character. The split image areas are vectorized according to the type of object included therein. Characters (and line drawings) are targets of vectorization. Note that characters may be made targets of character recognition, and character recognition processing may be performed thereon. A vectorization unit 2907 performs vectorization processing on character (and line drawing) images that were classified by the object splitting unit 2906, thereby obtaining vectorized data 2908. The vectorized data 2908 is stored in a box (storage unit 111) of the MFP 200. Alternatively, the image data binarized by the binarizing unit 2905 may be printed out by the recording unit 112.

As a result, regardless of whether input image data of the MFP 200 was obtained from a scanner or the box of another MFP, characters on an original document can be reproduced very faithfully.

Object Splitting

The following briefly describes object splitting processing and data stored in a box. In the object splitting processing, input image data is split into rectangular blocks according to attributes. As previously described, the attributes of rectangular blocks include "character", "photograph", and "graphic" (drawing, line drawing, table, etc.). Although these attributes are determined independent of the attributes determined in the image area separation processing in the present embodiment, the bitmaps of the image area flags may of course be referenced.

In an object splitting step, first the input image data is binarized into black-and-white, and groups of pixels enclosed in a black pixel outline are extracted. Furthermore, the size of a black pixel group extracted in this way is evaluated, and outline tracking is performed for a white pixel group that is inside a black pixel group whose size is greater than or equal to a predetermined value. The size of the white pixel group is evaluated, and the inner black pixel group is tracked, and as long as the inner pixel group is greater than or equal to a predetermined value, extraction and outline tracking are recursively performed on the inner pixel groups. The size of a pixel group is evaluated based on, for example, the area of the pixel group. A rectangular block that circumscribes the pixel group obtained in this way is generated, and an attribute is determined based on the size and shape of the rectangular block.

For example, a rectangular block whose aspect ratio is close to "1" and whose size is in a certain range is considered to be a character-corresponding block that is possibly a character area rectangular block. When character-corresponding blocks are regularly aligned close to each other, a new rectangular block that includes such character-corresponding blocks is generated, and the new rectangular block is considered to be a character area rectangular block.

In the case of a flat image group or a black pixel group encompassing square white pixel groups that are a certain size or larger and are aligned, such a pixel group is considered to be a graphic area rectangular block, and other pixel groups having unspecified shapes are considered to be photograph area rectangular blocks.

In the object splitting step, block information regarding attributes etc. and input file information, examples of which are shown in FIG. 23, are generated for each rectangular block generated as described above.

In FIG. 23, the block information includes an attribute, a positional coordinate X, a positional coordinate Y, a width W, a height H, and OCR information for each block. A numerical value of "1" to "3" is given as the attribute, where a value of "1" indicates a character area rectangular block, a value of "2" indicates a photograph area rectangular block, and a value of "3" indicates a graphic area rectangular block. The coordinates X and coordinates Y are the X and Y coordinates of a starting point (coordinates of a top left corner) of each rectangular block in the input image. The widths W and heights H are respectively the width in the X coordinate direction and height in the Y coordinate direction of each rectangular block. The OCR information indicates whether or not ("yes" or "no") pointer information exists in the input image. The input file information includes a total number of blocks N indicating the number of rectangular blocks.

The block information for each rectangular block is used in the vectorization of specified areas (e.g., character areas and graphic areas). The block information also enables specifying relative positional relationships in a case of compositing a specified area and another area, and enables compositing a vectorized area and a raster data area without impairing the layout of the input image.

In the vectorization processing, for example, a border between black pixels and white pixels in image data is described as a vector when viewing black pixels in a predetermined direction. However, since in this case the size is the pixel size and the description includes only vectors in the raster direction and a direction orthogonal thereto, a plurality of vectors are composited according to a predetermined rule. For example, vectors having the same end point, start point and direction are joined to composite a single vector, and orthogonal vectors are composited into a diagonal vector if a predetermined condition is satisfied. This obtains vector data indicating outline vectors. Furthermore, an outline vector can be converted into a centerline vector that is a combination of a vector indicating the center of a line and data indicating a width. For a graphic, conversion to a function indicating the graphic (or an approximation function) and a line width can be performed.

The vector data obtained here indicates characters and graphics that have the same thickness as recorded on the document, regardless of whether the input image data was input from a box in the MFP 100 or input from a box in the MFP 120. This is due to the fact that smoothing was performed on character areas by the MTF correction unit 2904.

Detailed Setting of Registration

Data vectorized in this way is stored in the SVG format or the like. In this format, vector objects, image objects, and the like are described for each attribute. If character recognition is/can be performed, an area with the "character" attribute is described as a text object and stored. Note that photograph area rectangular blocks are not vectorized, but rather are stored as image data.

BOX Storage Processing

After object splitting, vectorized data is converted into BOX storage data to be stored in the storage unit 111. As a result of the vectorization processing, the vectorized data is stored in an intermediate data format, which is called a Document Analysis Output Format (hereinafter, "DAOF") in the present embodiment. The DAOF is composed of a header, a layout description data portion, a character recognition description data portion, a table description data portion, and an image description data portion. Information regarding an input image to be processed is stored in the header. Information regarding characters, line drawings, drawings, tables, photographs, and the like, which are attributes of rectangular blocks in the input image, as well as position information for rectangular blocks that have been recognized as having such attributes is stored in the layout description data portion. Among the character area rectangular blocks, character recognition results obtained by character recognition are stored in the character recognition description data portion. Details on the table structure of graphic area rectangular blocks having the "table" attribute are stored in the table description data portion. Image data in graphic area rectangular blocks is extracted from input image data and stored in the image description data portion. For vectorized areas, groups of data expressing the inner structure of blocks obtained by vectorization processing, as well as the shapes of images, character codes, and the like are stored in the image description data portion. On the other hand, for rectangular blocks that are not specified areas and are not targets of vectorization processing, the input image data itself is stored in the image description data portion.

Figure 24:
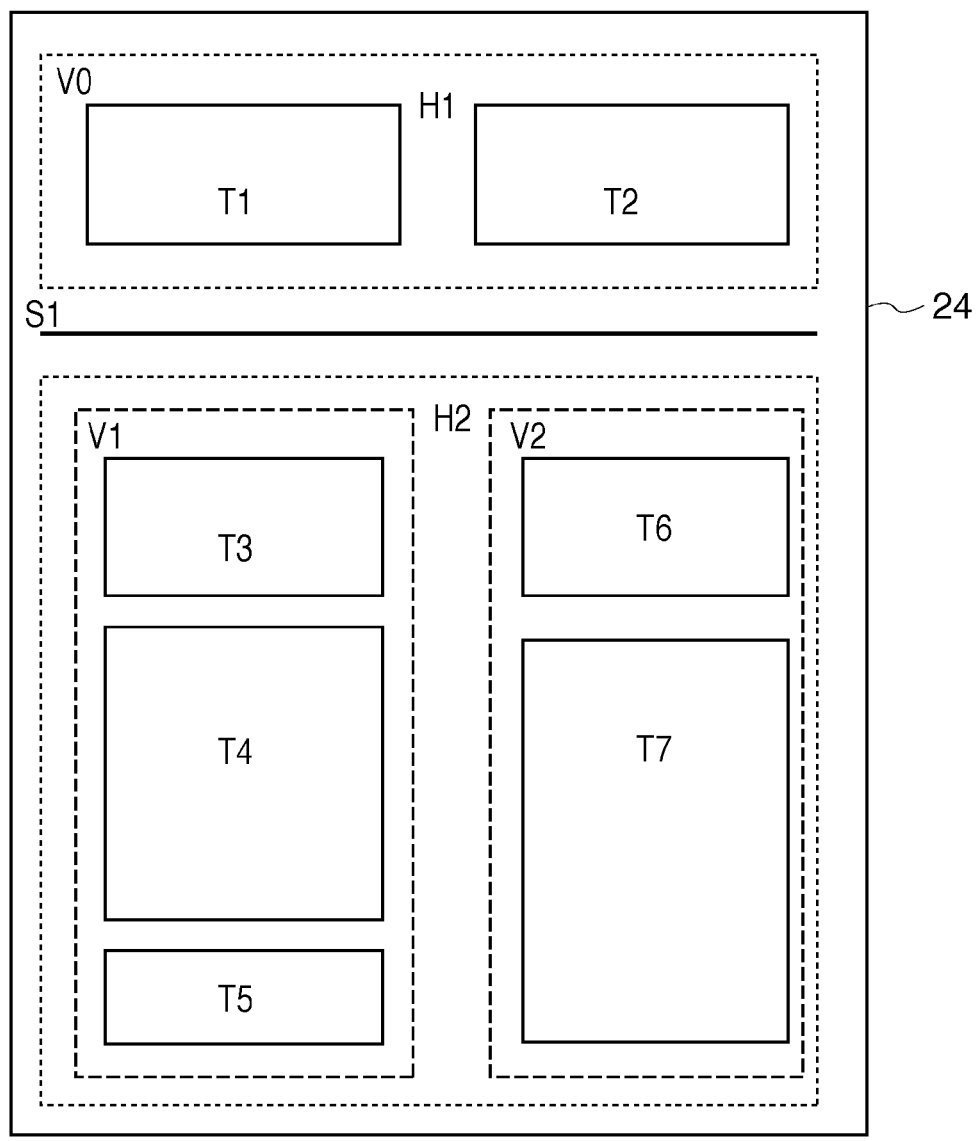
FIG. 24 is a diagram showing a document targeted for document tree structure generation processing.

In the processing for conversion to data for storage in a BOX, a document tree structure is generated from data in the DAOF, and based on the document tree structure, actual data in the DAOF is acquired, and storage data is generated. FIG. 25 shows an example of a document tree structure that is created, and as shown in FIG. 25, the root expresses the overall document, the leaves express the individual blocks, and nodes other than the root and the leaves express groups. FIG. 24 shows this structure when expressed as an image.

In the document tree structure generation processing, each rectangular block is regrouped based on the vertical relationships between the rectangular blocks. Here, a relationship is defined by a characteristic such as being in close proximity or having substantially the same block width (or height in the case of horizontal relationships). Also, information such as distance, width and height is extracted by referencing the DAOF.

At the top of the image data shown in FIG. 24, a rectangular block T1 and a rectangular block T2 are arranged in a line in the horizontal direction. A horizontal separator S1 is arranged below the rectangular blocks T1 and T2, and rectangular blocks T3, T4, T5, T6, and T7 are arranged below the horizontal separator S1. The rectangular blocks T3, T4 and T5 are arranged from top to bottom in the left half of the area below the horizontal separator S1, and the rectangular block T7 is arranged below the rectangular block T6 in the right half of the area below the horizontal separator S1.

Next, grouping processing is performed based on vertical relationships. As a result, as shown in FIG. 24, the rectangular blocks T3, T4 and T5 are placed in a single group (rectangular block) V1, and the rectangular blocks T6 and T7 are placed in a single group (rectangular block) V2. The groups V1 and V2 are in the same level.

Next, whether a vertical separator exists is checked. A separator is an object having a "line" attribute in the DAOF, and has a function of explicitly splitting blocks in application software. If a separator is detected, in the level targeted for processing, areas in the input image are split vertically using the separator as a borderline. A vertical separator does not exist in FIG. 24.

Next, a determination is made as to whether a total vertical height of groups is substantially equal to the height of the input image. That is to say, in the case of performing horizontal grouping while moving from one processing target area to another in the vertical direction (e.g., from top to bottom), the determination regarding the end of processing is performed with use of the fact that the total group height is the same as the height of the input image when processing for the entire input image has ended. Processing is ended if grouping has ended, and if grouping has not ended, subsequent processing is performed.

Next, grouping processing is performed based on horizontal relationships. As a result, in FIG. 24, the rectangular blocks T1 and T2 are placed in a single group (rectangular block) H1, and the rectangular blocks V1 and V2 are placed in a single group (rectangular block) H2. The groups H1 and H2 are in the same level. In this case as well, determination is performed for each microblock immediately after processing has started.

Next, whether a horizontal separator exists is checked. If a separator is detected, in the level targeted for processing, an area in the input image is split horizontally using the separator as a borderline. The horizontal separator S1 exists in FIG. 24.

As a result of the above processing, the tree shown in FIG. 25 is registered. In FIG. 25, an input image V0 has the groups H1 and H2 and the separator S1 at the top level, and the second-level rectangular blocks T1 and T2 belong to the group H1. The second-level groups V1 and V2 belong to the group H2, the third-level rectangular blocks T3, T4 and T5 belong to the group V1, and the third-level rectangular blocks T6 and T7 belong to the group V2.

Lastly, a determination is made as to whether the total horizontal length of groups is equal to the width of the input image. This enables determining the end of horizontal grouping. If the total horizontal length of groups is the same as the page width, the document tree structure generation processing is ended. If the total horizontal length of groups is not the same as the page width, the vertical relationship check is repeated from the beginning at one level higher. Repeating from one level higher involves repeating the above processing, where the rectangular blocks in the above description are replaced with groups constituted from rectangular blocks. In this way, grouping is performed hierarchically, and a document tree structure such as shown in FIG. 25 is generated. The document tree structure is stored in the BOX along with the DAOF data. A keyword for searching can also be attached to each object in the document to be stored. In the case of a character object area, a character string included therein can be selected as the keyword. In the case of object areas that are not character object areas, a character string included in a character object area in the vicinity can be selected as the keyword.

Note that although storage is performed after vectorization in the above description, binarized image data may be stored in a BOX.

In this way, character areas are extracted from input image data, and the character areas are smoothened and then binarized, thereby enabling realizing suitable character vectorization. Necessarily smoothing characters and line drawings eliminates the influence of the processing structure of image processing systems. Therefore, characters no longer vary in thickness depending on the processing structure. Although characters readily become thinner in edge emphasizing processing if binarization is performed beforehand, the thickness of the characters can be made approximately the same as in the character images of the original document by performing smoothing and binarization using an appropriate threshold value.

Note that although it is possible for neither edge emphasizing or smoothing to be performed, it is desirable to perform smoothing due to having the effect of removing noise in areas close to character edges. As a result, noise components do not readily appear in approximation processing during vectorization, and suitable approximated curves can be generated. In particular, the effect of smoothing is substantial in the case of characters that do not have smooth outlines, such as halftone characters. In other words, when vectorizing characters, extracting and smoothing character areas enables significantly improving the appearance of the characters.

Note that although image data is considered to be bitmap image data constituted from the brightness values of pixels in the present embodiment, the image data may be expressed by density instead of brightness. In other words, either density or brightness may be used.

Embodiment 2

In Embodiment 1, the binarizing unit 2905 performs a binarizing process using a fixed threshold value, but Embodiment 2 describes a case in which a variable threshold value is used.

Figure 12:
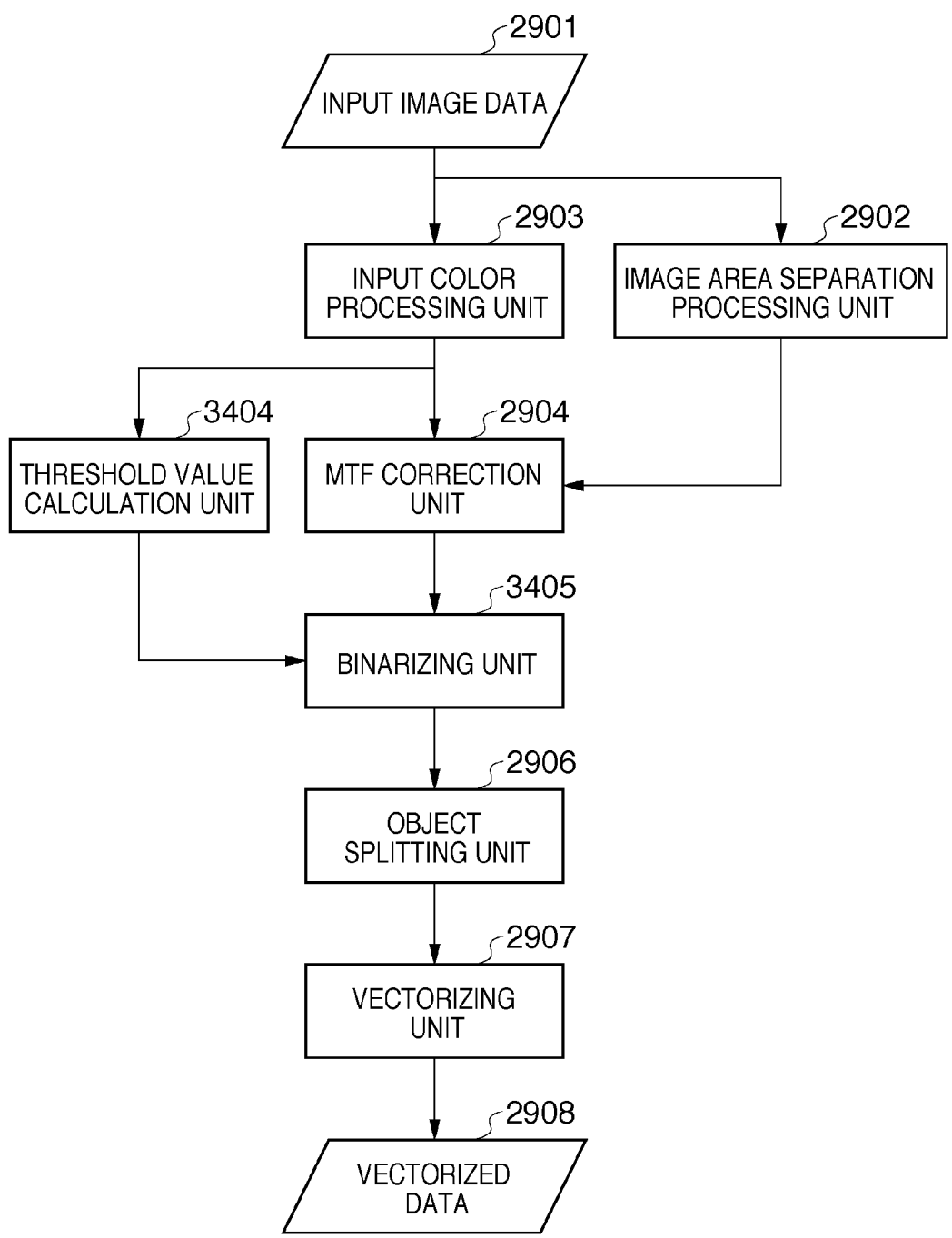
FIG. 12 is a diagram illustrating a structure of the present invention that is described in Embodiment 2.

FIG. 12 is a diagram showing such a processing structure. The processing structure shown in FIG. 12 is substantially the same as in FIG. 7 that is described in Embodiment 1. There are two differences in the processing, namely that a threshold value calculation unit 3404 has been added, and the binarizing unit 2905 that realizes the binarizing process using a fixed threshold value has been replaced with a binarizing unit 3405 that realizes the binarizing process using a variable threshold calculated by the threshold value calculation unit 3404.

The threshold value calculation unit 3404 uses a memory used by the MTF correction unit 2904, and in the exemplary case in which the MTF correction is a 5×5 spatial filter, the threshold value calculation unit 3404 uses the 5×5 area and calculates an average brightness level. In other words, the threshold value calculation unit 3404 functions as an average value calculator that calculates the average value of brightness. The threshold value calculation unit 3404 then changes the threshold value of the binarizing unit 3405 in accordance with the average brightness level. For example, if the ground of input image data includes a ground color, it is normally sufficient to lower the threshold value. Alternatively, the image area flags generated by the image area separation processing unit 2902 may be referenced, and an average brightness level may be calculated excluding character areas. This enables removing the influence of the ground color of the ground.

For example, a predetermined threshold value reference value (may be the threshold value used in Embodiment 1) may be provided, the calculated average brightness level may be subtracted from an average brightness reference value that has been determined in advance, the resulting difference may be subtracted from the threshold value reference value, and the thus resulting value may be employed as the threshold value. The threshold value reference value and average brightness reference value may be determined experimentally by, for example, actually reading paper documents.

In this way, the threshold value calculation unit 3404 calculates the threshold value to be used by the binarizing unit 3405, thereby realizing vectorization processing in which there is not influence from the ground color of a ground in input image data. Since a variable threshold value is used in this case, this processing structure is effective not only when the ground is a uniform color, but also when the ground is a color gradation.

Embodiment 3

Embodiment 1 describes an example in which the MTF correction unit 2904 performs smoothing if the image area flag generated by the image area separation processing unit 2902 indicates "character". Embodiment 3 describes a method for determining whether to perform smoothing in accordance with an MTF characteristic of edges in an input image.

Figure 13:
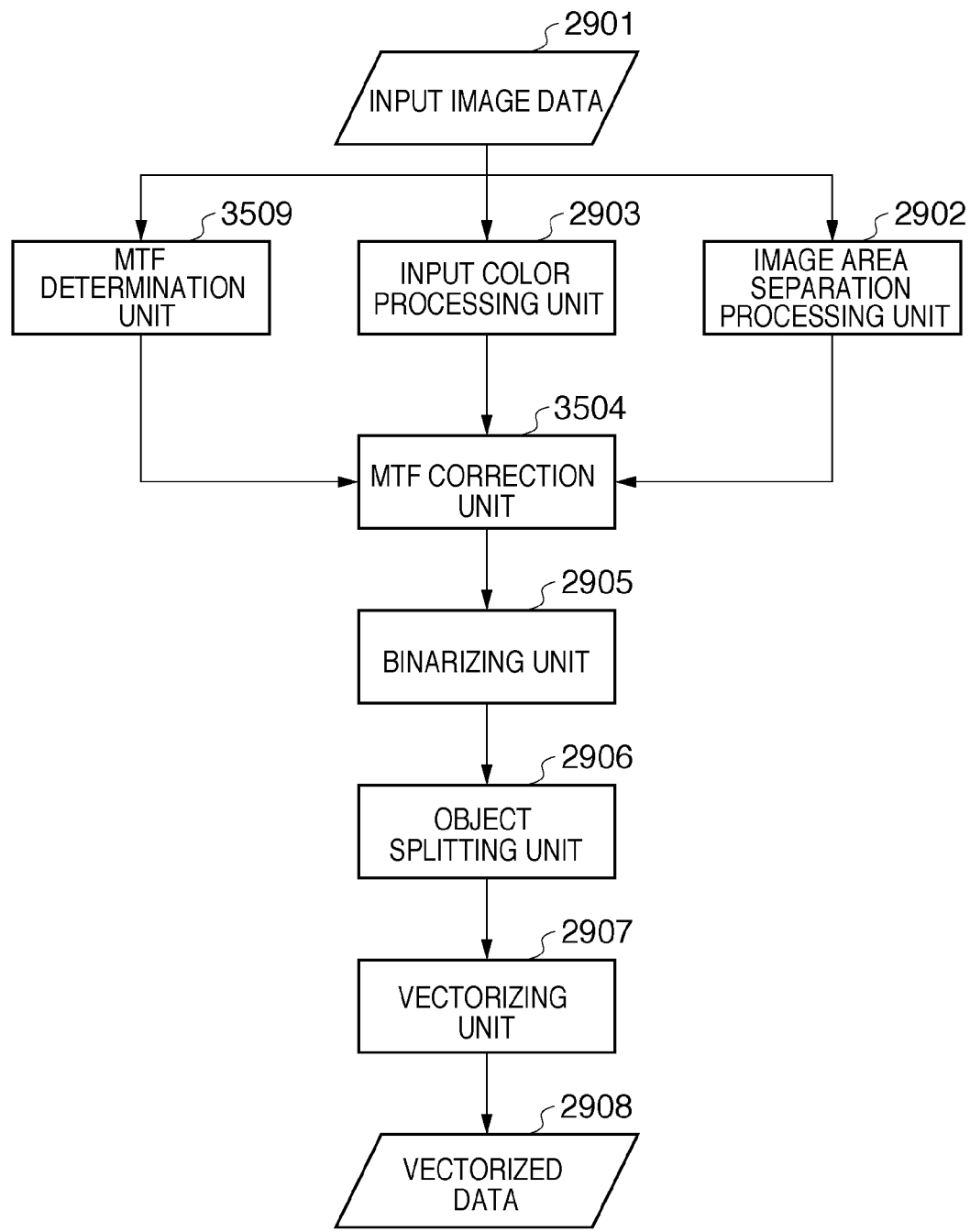
FIG. 13 is a diagram illustrating a structure of the present invention that is described in Embodiment 3.

FIG. 13 is a diagram showing such a processing structure. The processing structure shown in FIG. 13 is substantially the same as in FIG. 7 that is described in Embodiment 1. There are two differences in the processing, namely that an MTF determination unit 3509 has been added, and an MTF correction unit 3504. The MTF correction unit 3504 has a function for variably switching the level of MTF correction based on a signal from the MTF determination unit 3509, and is a constituent element that replaces the MTF correction unit 2904 that switches smoothing and edge emphasis based on the image area flags generated by the image area separation processing unit 2902.

The MTF determination unit 3509 calculates a contrast from variations in signal values in the vicinity of the pixel of interest, and determines whether the pixel of interest is a pixel that has been edge-emphasized or a pixel that has been smoothened. An exemplary method for calculating contrast is shown in FIG. 19. In order to calculate a contrast, in an N×M (N and M being integers) area, with the pixel of interest as the center, a gradient of signal value is obtained for four directions, namely a vertical direction 4104, a horizontal direction 4103, a diagonal direction 4102, and a diagonal direction 4105. For example, with the pixel of interest as the center, a difference of pixel values of pixels that are adjacent above and below is obtained.

$$d1=|(x1,y2)-(x1,y0)|$$

$$d2=|(x0,y1)-(x2,y1)|$$

$$d3=|(x0,y0)-(x2,y2)|$$

$$d4=|(x0,y2)-(x2,y0)|$$

$$d0=\text{MAX}(d1,d2,d3,d4)$$

Here, d0, d1, d2, d3, and d4 are positive integers.

In the case of this method, the value having the largest gradient is selected from among the gradient of signal values in the four directions. This maximum value is the output of the MTF determination unit 3509. This value is sent to the MTF correction unit 3504, which compares the value with a predetermined value and controls the MTF correction level. For example, if the value of the maximum value d0 is greater than a reference value P0 (P0 being a positive integer) that has been determined in advance, the pixel of interest is determined to have been edge-emphasized. Conversely, if the value of the maximum value d0 is less than the reference value P0, the pixel of interest is determined to have been smoothened. Alternatively, two predetermined reference values P1 and P2 (P1<P2, and P1 and P2 being positive integers) may be provided, edge emphasis may be determined to have been performed if the maximum value exceeds P2, smoothing may be determined to have been performed if the maximum value falls below P1, and edge emphasis and smoothing may be determined to not have been performed (called "normal") if the maximum value is between P1 and P2. In this way, the MTF determination unit 3509 determines the MTF characteristics of the input image data 2901. Also, the image area separation processing unit 2902 determines the attributes of the pixel of interest, the results of the two determinations are received, and the MTF correction unit 3504 performs MTF correction.

The following are examples of cases that may occur.

(1) If the image area separation processing unit 2902 determines "character", and furthermore the MTF determination unit 3509 determines "edge emphasis"

MTF correction unit 3504 performs smoothing correction (high level)

(2) If the image area separation processing unit 2902 determines "character", and furthermore the MTF determination unit 3509 determines "normal"

MTF correction unit 3504 performs smoothing correction (low level)

(3) If the image area separation processing unit 2902 determines "character", and furthermore the MTF determination unit 3509 determines "smoothing"

MTF correction unit 3504 does not perform correction (4) If the image area separation processing unit 2902 determines anything other than "character", and furthermore the MTF determination unit 3509 determines "edge emphasis"

MTF correction unit 3504 does not perform correction (5) If the image area separation processing unit 2902 determines anything other than "character", and furthermore the MTF determination unit 3509 determines "normal"

MTF correction unit 3504 performs edge emphasis correction (low level)

(6) If the image area separation processing unit 2902 determines anything other than "character", and furthermore the MTF determination unit 3509 determines "smoothing"

MTF correction unit 3504 performs edge emphasis correction (high level)

Here, the concept of a "character" includes line drawings. In this way, if an area has the object type "character" or "line drawing" and has not been smoothened, smoothing is performed on the area. Also, if an area has an object type other than "character" and has not been smoothened, smoothing is performed on the area. Although the MTF correction unit performs three levels of processing here, namely high level smoothing, low level smoothing, and no processing, the present invention is not limited to this. More than one level of smoothing may be provided, and the results of the MTF determination may be classified according to the number of levels. Also, there is no need for the classifications to be in even proportions.

Note that the combination of the above-described determination results and correction processing method is not limited to this. Furthermore, although Embodiment 3 describes a method of viewing gradient of signal values in a 3 pixel×3 pixel area, the present invention is not limited to this. The method of calculating the gradient of signal values is also not limited to this. For example, gradients may be calculated using an area and using a spatial filter processing such as a differential filter.

Although determination is performed for each pixel and processing is performed for each pixel in the above description, in the exemplary case where a series of results of the MTF correction unit 3504 is "edge emphasis", it may be determined that the entire input image is an edge-emphasized image, and the determination results for a certain portion may be used as the determination result of the entire image. In this case, it is sufficient to count the results of the MTF correction unit 3504 and perform a determination.

In this way, the MTF characteristics of input image data are determined, and the correction method of MTF correction is controlled based on the determination result, thereby enabling generating vectorized data in which the thickness of characters is suitably reproduced. Also, referencing both the MTF characteristics determination result and the attribute flags generated in the image area separation processing enables performing suitable MTF correction on character areas and photograph areas.

Embodiment 4

Embodiment 3 describes a method for controlling the correction method used by the MTF correction unit 3504 according to the results of the MTF determination unit 3509 and the image area separation processing unit 2902. Embodiment 4 describes a method for controlling the binarizing process according to the results of the MTF determination unit 3509 and the image area separation processing unit 2902.

Figure 14:
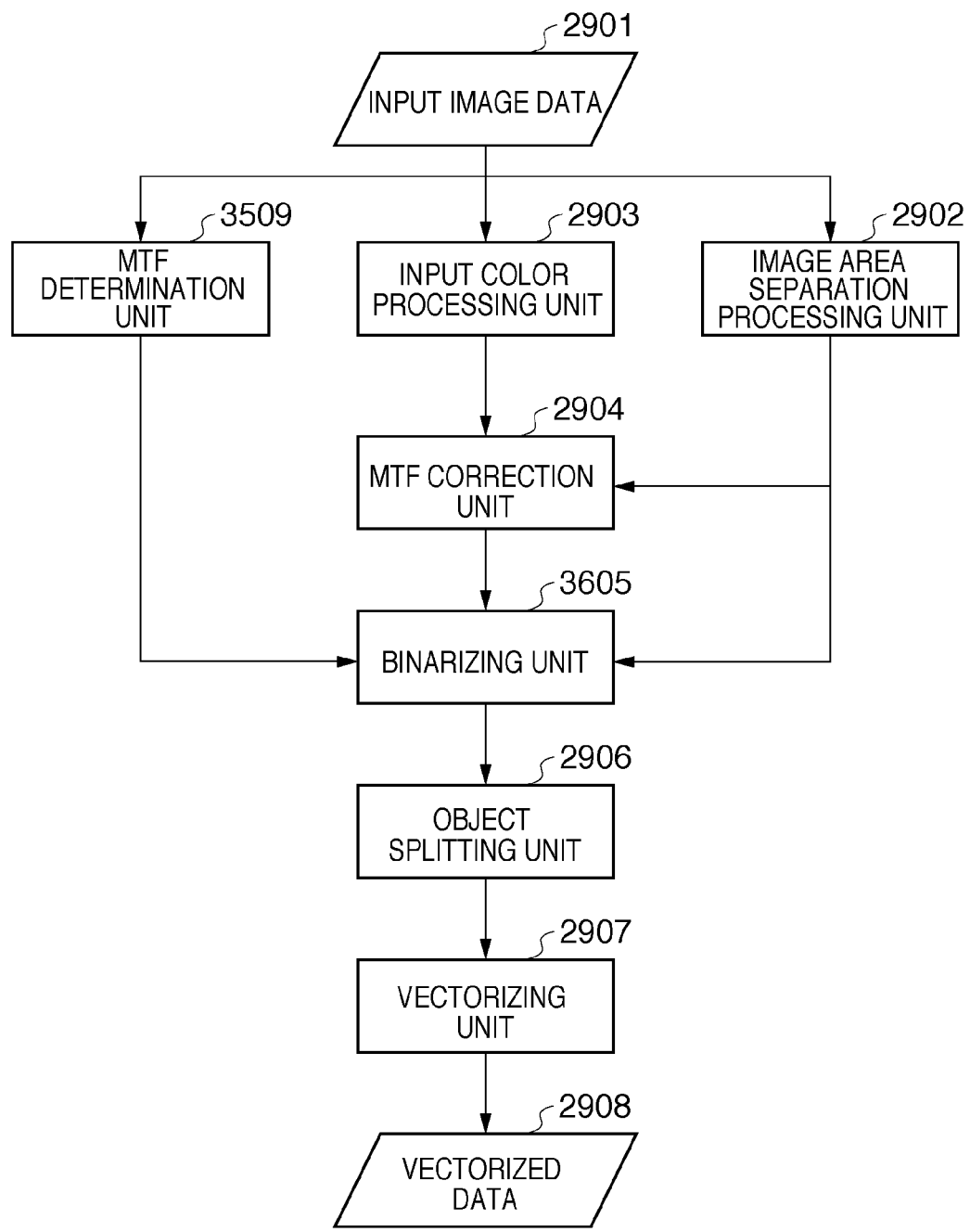
FIG. 14 is a diagram illustrating a structure of the present invention that is described in Embodiment 4.

FIG. 14 is a diagram showing such a processing structure. The processing structure shown in FIG. 14 is substantially the same as in FIG. 13 that is described in Embodiment 3. However, the processing unit that inputs the determination result of the MTF determination unit 3509 is a binarizing unit 3605, not the MTF correction unit.

In the present embodiment, the threshold value of the binarizing unit 3605 is varied with use of multivalued determination results output from the MTF determination unit. As described in Embodiment 3, the MTF determination unit 3509 calculates the contrast of a pixel of interest with the use of an N×M (N and M being integers) area. Since the input image data 2901 is multivalued image data, the value (maximum value d0) output from the MTF determination unit 3509 is also multivalued. The following describes a method for determining the binarization threshold value with reference to FIG. 20, taking the example of the value output from the MTF determination unit 3509 being a gradient of signal value.

Figure 20:
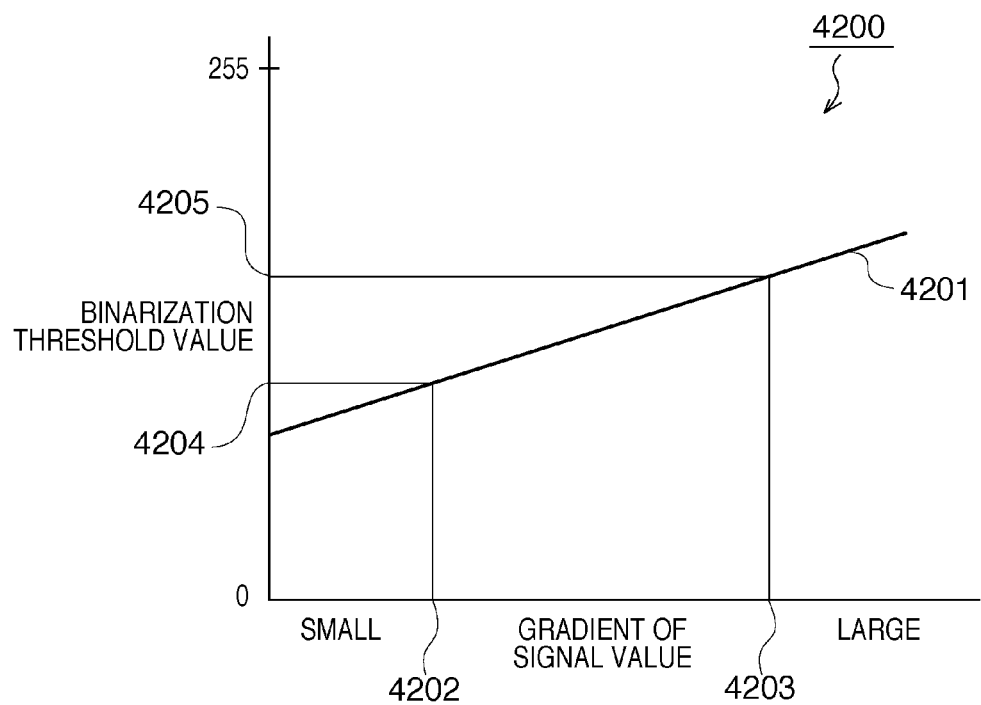
FIG. 20 is a diagram illustrating a method for calculating a binarization threshold value of a pixel, which is described in an embodiment.

FIG. 20 is a diagram showing an exemplary relationship between gradient of signal values output from the MTF determination unit 3509, which are plotted on the X axis, and binarization threshold values used by the binarizing unit 3605, which are plotted on the Y axis. For example, if an image that has previously been smoothened is the input image data 2901, the gradient value output from the MTF determination unit 3509 is small, such as a pixel value 4202. At this time, binarization threshold values are associated based on a function 4201 that is a straight line or a curved line. In this case, a binarization threshold value 4204 is obtained. In the case of extracting characters from a smoothened image, the contrast has been reduced due to smoothing, and therefore it is desirable to set a threshold that is somewhat lower than a normal threshold value for the brightness signal level. This enables suppressing an increase in the thickness of the characters.

On the other hand, if an image that has been edge-emphasized is the input image data 2901, the gradient value output from the MTF determination unit 3509 is large, such as a pixel value 4203. At this time, binarization threshold values are associated based on the function 4201 that is a straight line or a curved line. In this case, a binarization threshold value 4205 is obtained. In the case of extracting characters from an edge-emphasized image, the contrast has been increased due to the edge emphasis, and therefore it is desirable to set a threshold that is somewhat higher than a normal threshold value at the brightness signal level. This enables suppressing a reduction in the thickness of the characters.

Also, this control in binarization may be linked to the results of the image area separation processing unit 2902. If the result of the image area separation processing unit 2902 is "character", a variable threshold value that is lined to the determination result of the MTF determination unit 3509 may be used, and otherwise a fixed threshold value may be used. Even if the result of the image area separation processing unit 2902 is not "character", the threshold value may be linked to the determination result of the MTF determination unit 3509. In this case, the relationship between binarization threshold values and gradient of signal values in consideration of a photograph area is preferably different from a case of characters.

In this way, the MTF characteristics of input image data are determined, and the threshold value in binarization processing is controlled based on the determination result, thereby enabling generating vectorized data in which the thickness of characters is suitably reproduced. Also, referencing both the MTF characteristics determination result and the attribute flags generated in the image area separation processing enables performing suitable binarization processing on character areas and photograph areas.

Embodiment 5

Embodiment 1 describes a method for controlling the correction method used by the MTF correction unit 3504 for character areas and other areas according to the results of the image area separation processing unit 2902. Embodiment 5 describes a case in which characters are separated to a greater extent.

Figure 21:
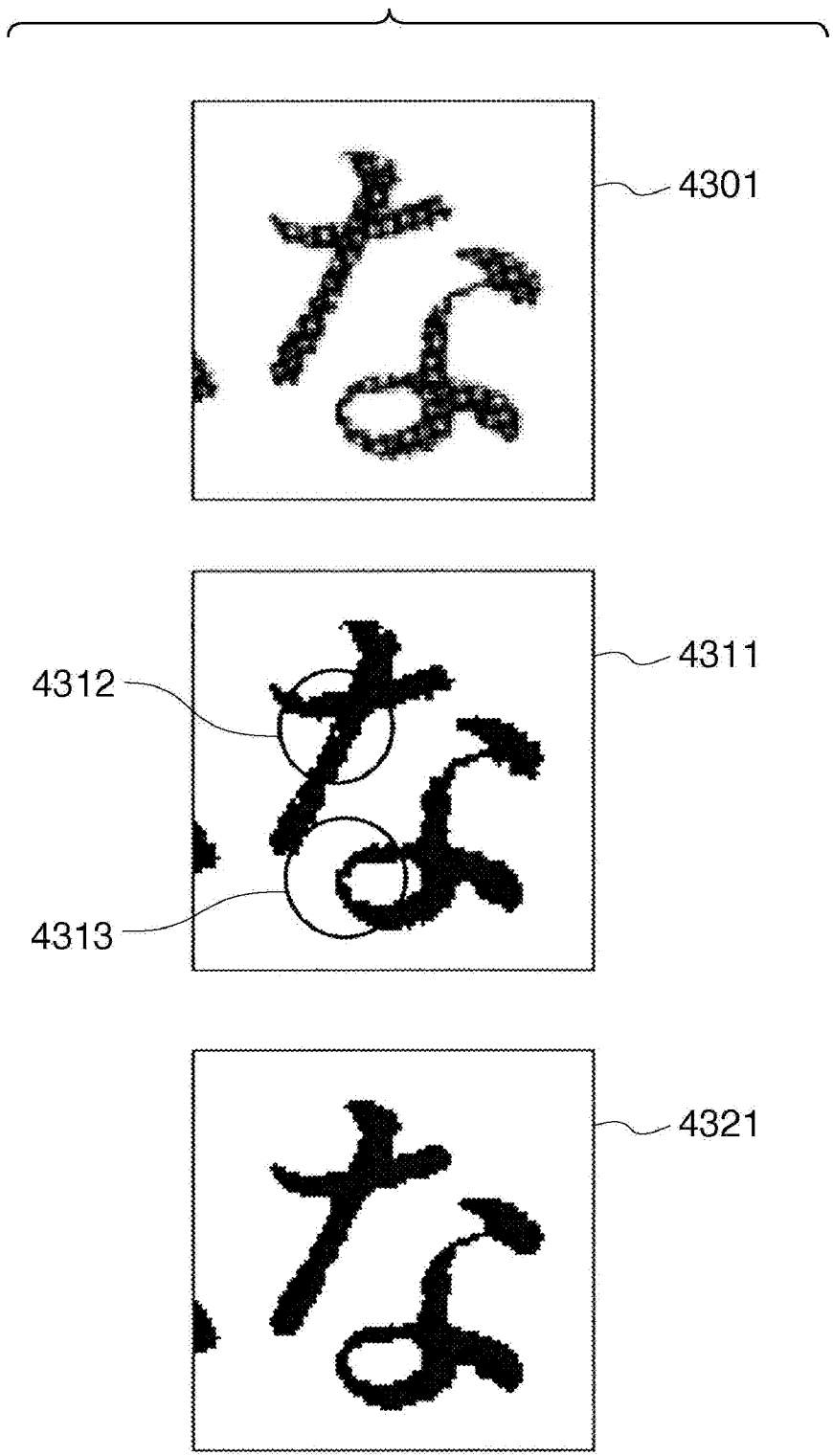
FIG. 21 is a diagram illustrating an exemplary image described in an embodiment.

FIG. 21 shows concrete examples of characters. A halftone character 4301 is a character on a printed work, and is formed from halftone dots. Since the halftone character 4301 is formed from halftone dots, the shape of the halftone dots remains in the edges of the character, and the outline of the character is not smooth. The structure of the halftone dots also remains in the interior of the character, and white portions can appear depending on the density. This phenomenon is unavoidable since it occurs due to reproducing the halftone. Vectorizing such a character obtains a vectorized character 4311. The outline of the obtained vectorized character 4311 has many jagged edges and missing portions as shown in 4313, for example. White portions also appear in the interior of the character, as shown in 4312. In other words, even in the case of a character, if the character is a halftone character formed from halftone dots or the like (including light grey characters and color characters) rather than a solid-fill character, and such a character is vectorized, jagged edges appear in the character outline, and white portions appear in the character interior.

Figure 15:
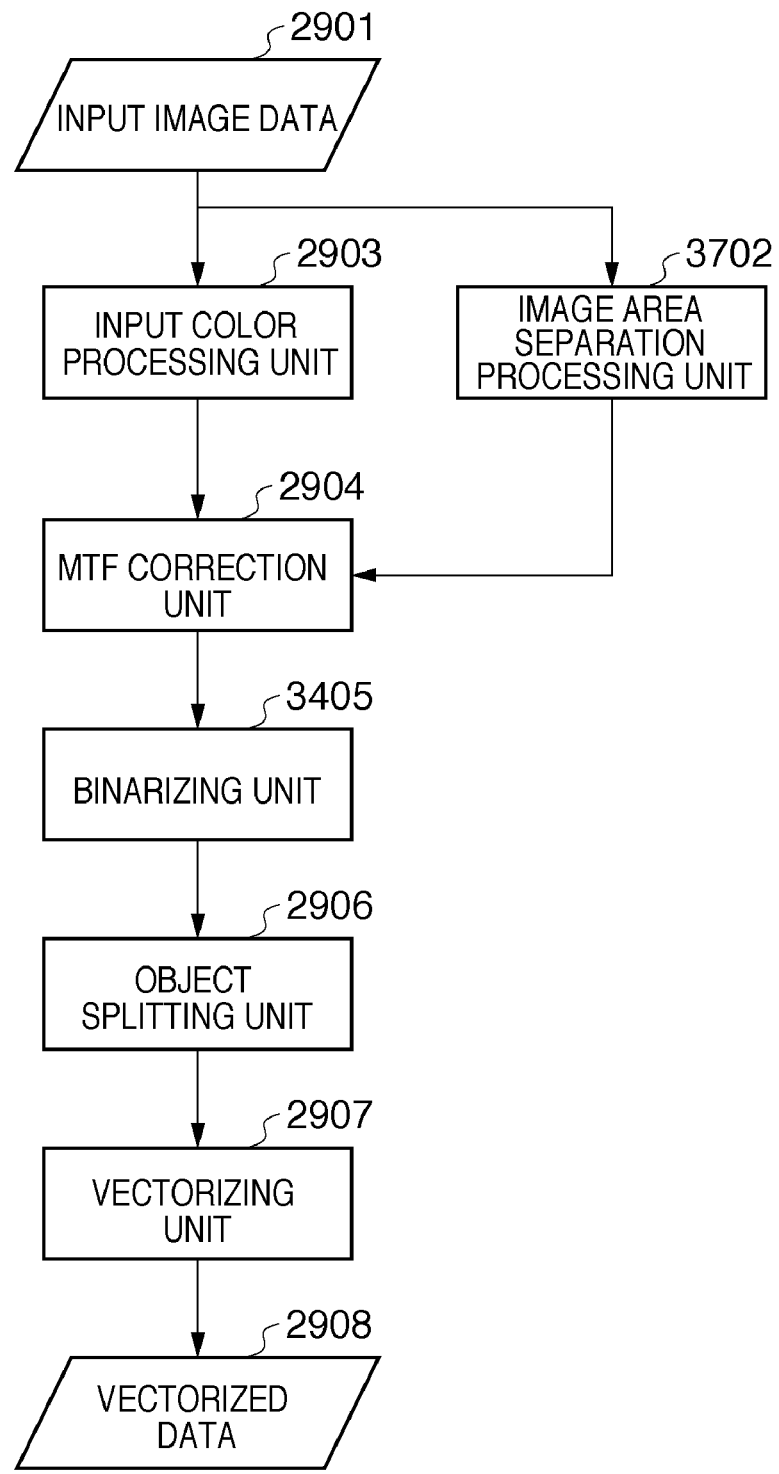
FIG. 15 is a diagram illustrating a structure of the present invention that is described in Embodiment 5.

FIG. 15 shows a processing structure for addressing this problem. The processing structure shown in FIG. 15 is substantially the same as in FIG. 7 that is described in Embodiment 1. Only the processing performed by the image area separation processing unit is different.

Figure 22:
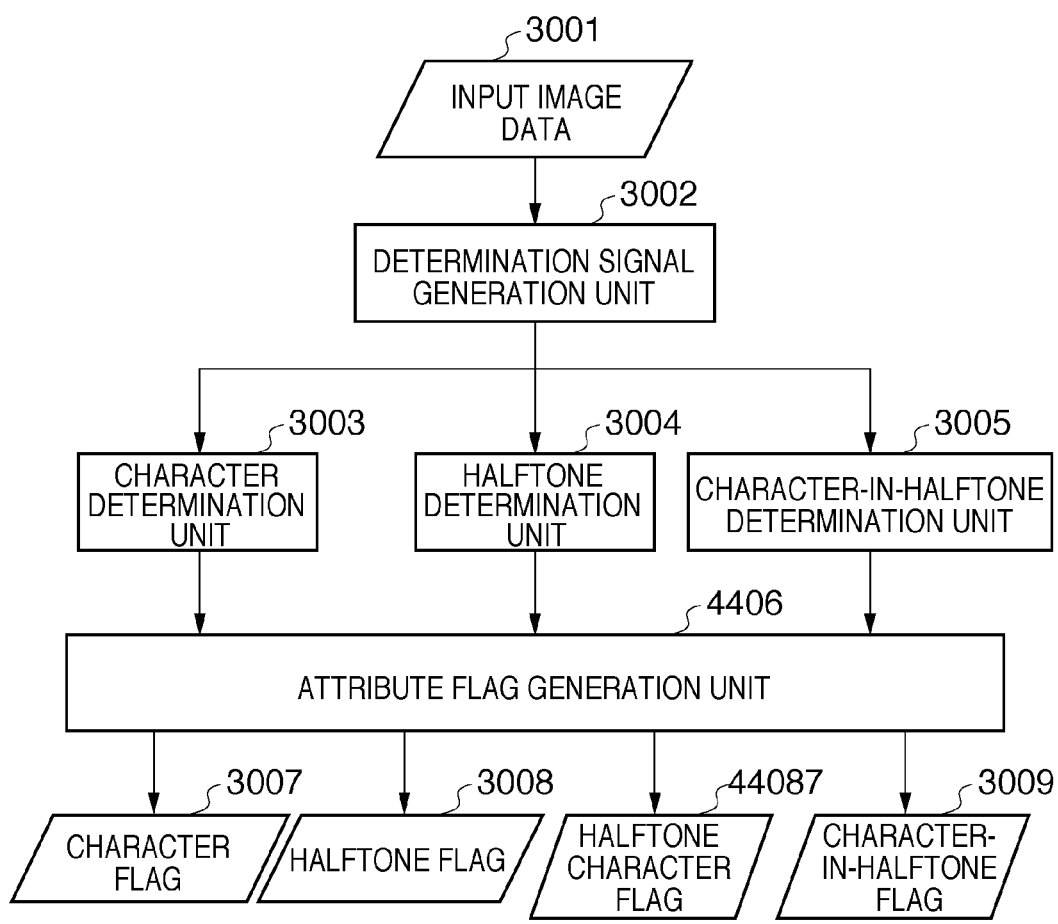
FIG. 22 is a diagram illustrating image area separation processing in MFP image processing described in an embodiment.

FIG. 22 shows the structure of an image area separation processing unit 3702. The processing structure in FIG. 22 is the same as in FIG. 8. The differences are the attribute flag generation unit 3006 (4406 in FIG. 22) and part of the flags generated thereby. In the present embodiment, a halftone character flag 4408 is also generated.

The attribute flag generation unit 4406 generates attribute flags based on the character determination result obtained by the character determination unit 3003, the halftone determination result obtained by the halftone determination unit 3004, and the character-in-halftone determination result obtained by the character-in-halftone determination unit 3005. The following are examples of generating attribute flags based on the above results.

(1) Halftone signal: HIGH, Character signal: LOW→Image attribute: halftone (2) Halftone signal: LOW, Character signal: HIGH→Image attribute: character (3) Halftone signal: HIGH, Character signal: HIGH→Image attribute: halftone character (4) Halftone signal: HIGH, Character-in-halftone signal: HIGH→Image attribute: character-in-halftone In a case other than the above, the image attribute is set to "image" (dot image). Addressing the above-described problem is realized by making the determination "halftone character" when both the halftone signal and character signal are HIGH. Smoothing a character that has been determined to be halftone character enables suppressing white portions in the halftone and jagged edges. The halftone character 4301 is recognized as a halftone character, and smoothened and vectorized, thus obtaining a vectorized character 4321. In other words, in the present embodiment, halftone characters are determined to be characters, and are targeted for smoothing. Compared to the previously shown vectorized character 4311, the outline of the vectorized character 4321 has fewer jagged edges, and the character interior does not have any white portions.

Note that the level of smoothing for halftone characters may be the same as or different than solid-fill characters. In particular, setting a higher level is more effective for halftone characters that are low-density and whose outlines have jagged edges.

In this way, normal characters and halftone characters are identified, and halftone characters are smoothened as well, thereby enabling suppressing white portions in the halftone and jagged edges.

Embodiment 6

Embodiment 5 describes a method for controlling the correction method used by the MTF correction unit 3504 for character areas and other areas according to the results of the image area separation processing unit 2902. Embodiment 6 describes a case of performing MTF correction and the binarizing process in consideration of the MTF characteristics of the input image data 2901.

Figure 16:
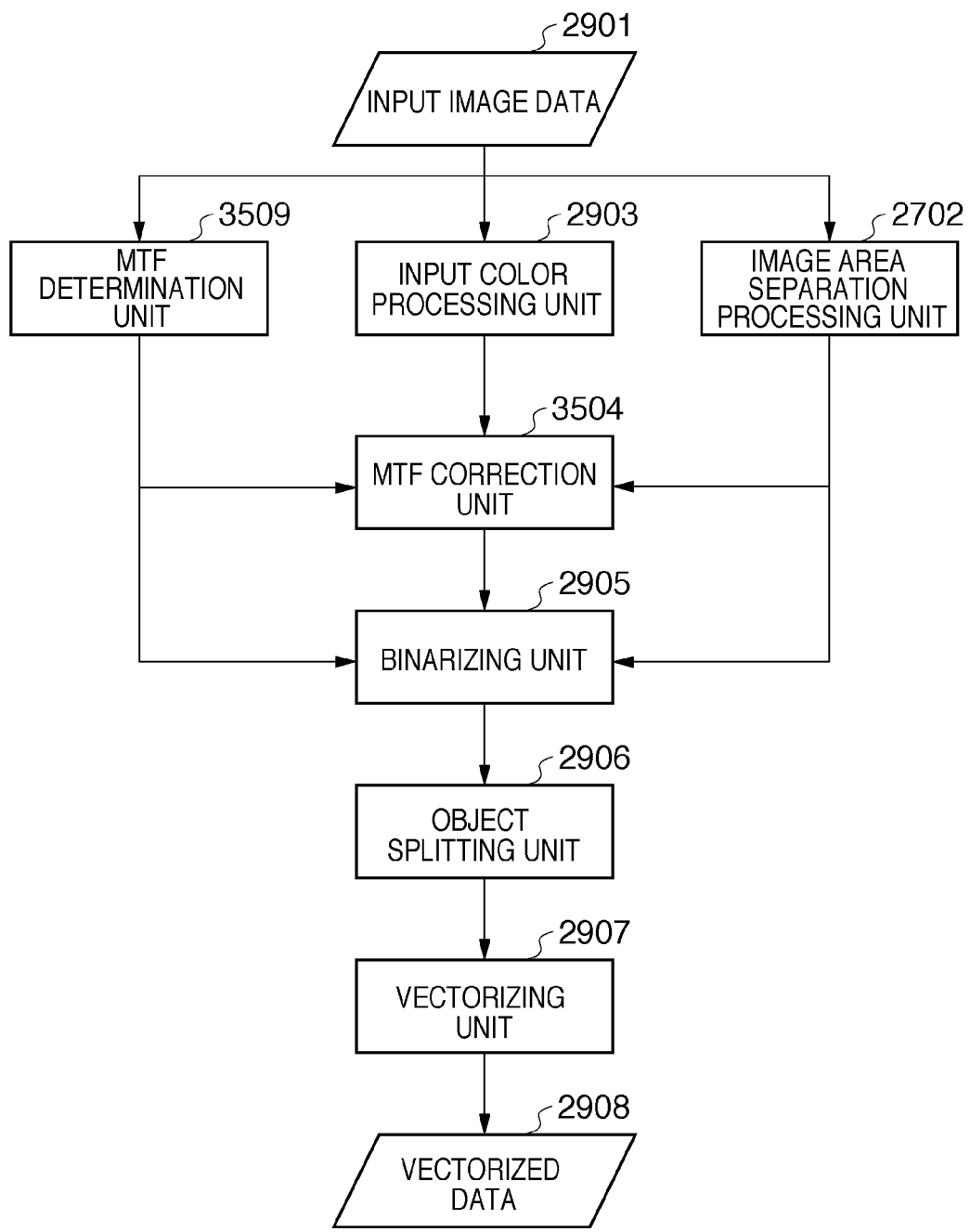
FIG. 16 is a diagram illustrating a structure of the present invention that is described in Embodiment 6.

FIG. 16 is a diagram showing such a processing structure. In FIG. 16, Embodiments 3, 4 and 5 have been combined.

The input image data 2901 is separated into character areas, halftone character areas, photograph areas, and the like based on the results of the image area separation processing unit 3702, and the MTF correction unit 3504 performs appropriate MTF correction thereon. In this case, if the input image data 2901 is deduced to be an edge-emphasized image based on the result of the MTF determination unit 3509, the character areas are smoothened. The halftone character areas are also smoothened in this case. In this case, using different levels of smoothing is highly effective.

The binarizing unit 2905 controls the binarization threshold value according to the gradient of signal values output due to the determination of the MTF determination unit 3509. In this case, since an edge-emphasized image is smoothened by the MTF correction unit 3504 as described above, in the case of edge-emphasized images as well, the binarization threshold value does not need to be set as high as described in Embodiment 4. It is sufficient to use a value that is appropriate in this system. Note that applying the above-described variable threshold to character areas and applying a fixed threshold value to photograph areas according to the output result of the image area separation processing unit 3702 enables accommodating both characters and photos.

In this way, the level of MTF correction in the MTF correction unit 3504 is set appropriately, and according to the result of the MTF determination unit 3509, whether the input image data 2901 has been edge-emphasized is deduced, and an appropriate binarization threshold value is set, thereby improving the appearance of character images.

Note that the present invention may be applied to a system constituted from a plurality of a devices (e.g., a host computer, an interface device, a reader, and a printer), and may be applied to an apparatus composed of a single device (e.g., a multifunction peripheral or a facsimile apparatus). A recording medium having recorded thereon a program that realizes the functionality of the above-described embodiments may be supplied to a system or apparatus, and the object of the present invention may be achieved by a computer in the system or apparatus reading out and executing the program stored on the recording medium. In this case, the program itself read out from the recording medium realizes the functionality of the above-described embodiments, and the program itself and the recording medium on which it is recorded constitute the present invention.

The present invention also encompasses the case in which an operating system (OS) or the like running on the computer performs part or all of the actual processing based on instructions in the program, and the functionality of the above-described embodiments is realized by such processing. Furthermore, the present invention is applicable to a case in which the program read out from the recording medium is written to a memory in a function expansion card inserted in the computer or a function expansion unit connected to the computer. In this case, a CPU or the like provided in the function expansion card or function expansion unit may perform all or part of the actual processing based on instructions in the written program, and the functionality of the above-described embodiments may be realized by such processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-127380, filed May 14, 2008, which is hereby incorporated by reference herein in its entirety.

What is claimed is:

1. An image processing apparatus comprising:
    at least a processor and memory, cooperating to function as:
    an image area separator, configured to specify an object type for each area of image data;
    a converter, configured to smoothen only image data in the area whose object type has been specified as a character or a line drawing by said image area separator, by converting a spatial frequency characteristic of only the image data in the area whose object type has been specified as a character or a line drawing;
    a binarizer, configured to binarize the image data whose spatial frequency characteristic has been converted by said converter; and
    a vectorizer, configured to obtain vector data by vectorizing the image data that has been binarized by said binarizer.

2. The image processing apparatus of claim 1, wherein a character is a halftone character.

3. The image processing apparatus according to claim 1, wherein said converter edge-emphasizes image data in an area whose object type is neither a character nor a line drawing.

4. The image processing apparatus according to claim 1, wherein said at least a processor and memory further cooperate to function as an average value calculator, configured to calculate an average value of density or brightness in the image data,
    wherein said binarizer binarizes target image data with use of a threshold value that has been determined based on an average value of density or brightness of the target image data that has been calculated by said average value calculator.

5. The image processing apparatus according to claim 4, wherein said average value calculator calculates an average value of density or brightness for image data in an area that has been specified by said image area separator, excluding an area having a predetermined object type.

6. The image processing apparatus according to claim 1, said at last a processor and memory further cooperate to function as a determiner, configured to determine a type of image processing previously performed on image data which converts a spatial frequency characteristic of the image data,
    wherein said converter converts a spatial frequency characteristic of image data in an area based on an object type of the area that has been specified by said image area separator and a type of image processing determined by said determiner with respect to the area.

7. The image processing apparatus according to claim 6, wherein for an area whose object type is a character or a line drawing, if the type of image processing previously performed on the area is not smoothing, said converter smoothens image data in the area by converting a spatial frequency characteristic of the image data in the area.

8. The image processing apparatus according to claim 6, wherein for an area whose object type is neither a character nor a line drawing, if the type of image processing previously performed on the area is not edge-emphasizing, the converter edge-emphasizes image data of the area by converting a spatial frequency characteristic of the area.

9. The image processing apparatus according to claim 1, wherein said at least a processor and memory further cooperate to function as a determiner, configured to determine a type of image processing previously preformed on an image area which converts a spatial frequency characteristic of the image data,
    wherein said binarizer binarizes target image data with use of a binarization threshold value that is in accordance with the type of image processing determined by said determiner.

10. An image processing apparatus comprising:

at least a processor and memory, cooperating to function as:
- an image area separator, configured to specify an object type for each area of image data;
- a converter, configured to smoothen only image data in the area whose object type has been specified as a character or a line drawing by said image area separator, by converting a spatial frequency characteristic of only the image data in the area whose object type has been specified as a character or a line drawing;
- a determiner, configured to determine a type of image processing previously preformed on an image area which converts a spatial frequency characteristic of the image data; and
- a binarizer, configured to binarize the image data whose spatial frequency characteristic has been converted by said converter, wherein said binarizer binarizes target image data with use of a binarization threshold value that is in accordance with the type of image processing determined by said determiner, and wherein, in a case of an object type that is a character or a line drawing, said binarizer uses a threshold value that is greater than a threshold value in a case of an object type that is neither a character nor a line drawing.

11. An image processing apparatus comprising:

at least a processor and memory cooperating to function as:
- an image area separator, configured to specify an object type for each area of image data;
- a converter, configured to smoothen only image data in the area whose object type has been specified as a character or a line drawing by said image area separator, by converting a spatial frequency characteristic of only the image data in the area whose object type has been specified as a character or a line drawing;
- a determiner, configured to determine a type of image processing previously preformed on an image area which converts a spatial frequency characteristic of the image data; and
- a binarizer, configured to binarize the image data whose spatial frequency characteristic has been converted by said converter, wherein said binarizer binarizes target image data with use of a binarization threshold value that is in accordance with the type of image processing determined by said determiner, and wherein
- if an object type of an area specified by said image area separator is a character or a line drawing, said binarizer binarizes target image data with use of a binarization threshold value that is in accordance with the type of image processing determined by said determiner, and
- if an object type of an area specified by said image area separator is neither a character nor a line drawing, said binarizer binarizes target image data with use of a fixed binarization threshold value.

12. A non-transitory computer-readable storage medium storing therein a program for causing a computer to execute an image processing method in an image processing apparatus, the image processing method comprising the steps of:
- specifying an object type for each area of image data;
- smoothening image only data in the area whose object type has been specified as a character or a line drawing in said specifying step, by converting a spatial frequency characteristic of only the image data in the area whose object type has been specified as a character or a line drawing;
- binarizing the image data whose spatial frequency characteristic has been converted in said smoothening step; and
- obtaining vector data by vectorizing the image data that has been binarized in the binarizing step.

13. An image processing method in an image processing apparatus, comprising the steps of:
- specifying an object type for each area of image data;
- smoothening image only data in the area whose object type has been specified as a character or a line drawing in said specifying step, by converting a spatial frequency characteristic of only the image data in the area whose object type has been specified as a character or a line drawing;
- binarizing the image data whose spatial frequency characteristic has been converted in said smoothening step; and
- obtaining vector data by vectorizing the image data that has been binarized in the binarizing step.

* * * * *